United States Patent
Fujiwara et al.

(10) Patent No.: US 9,122,094 B2
(45) Date of Patent: Sep. 1, 2015

(54) ILLUMINATING APPARATUS AND DISPLAY APPARATUS

(75) Inventors: Kohji Fujiwara, Osaka (JP); Takayuki Murai, Osaka (JP); Kingfoong Lew, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 875 days.

(21) Appl. No.: 13/389,811

(22) PCT Filed: Mar. 15, 2010

(86) PCT No.: PCT/JP2010/054308
§ 371 (c)(1),
(2), (4) Date: Feb. 10, 2012

(87) PCT Pub. No.: WO2011/024498
PCT Pub. Date: Mar. 3, 2011

(65) Prior Publication Data
US 2012/0139445 A1    Jun. 7, 2012

(30) Foreign Application Priority Data

Aug. 31, 2009    (JP) .................................. 2009-199218

(51) Int. Cl.
| | | |
|---|---|---|
| H05B 37/02 | (2006.01) | |
| G02F 1/1337 | (2006.01) | |
| F21S 10/00 | (2006.01) | |
| G02F 1/1335 | (2006.01) | |

(52) U.S. Cl.
CPC .................... *G02F 1/133603* (2013.01); *G02F 2001/133613* (2013.01)

(58) Field of Classification Search
CPC .............. G02F 1/133603; G02F 2001/133613
See application file for complete search history.

(56) References Cited

U.S. PATENT DOCUMENTS

| | | | |
|---|---|---|---|
| 2006/0092346 A1 | 5/2006 | Moon et al. | |
| 2007/0297172 A1* | 12/2007 | Furukawa et al. | 362/231 |
| 2008/0259252 A1 | 10/2008 | Tanaka et al. | |
| 2009/0168396 A1* | 7/2009 | Moriyasu et al. | 362/84 |
| 2009/0168401 A1* | 7/2009 | Kwon et al. | 362/97.1 |
| 2009/0256492 A1* | 10/2009 | Lee et al. | 315/291 |
| 2009/0316386 A1* | 12/2009 | Yun et al. | 362/97.1 |
| 2010/0053496 A1* | 3/2010 | Park et al. | 349/61 |
| 2010/0141167 A1* | 6/2010 | Kato | 315/287 |

FOREIGN PATENT DOCUMENTS

| | | | |
|---|---|---|---|
| JP | 2006-064899 A | | 3/2006 |
| JP | 2006-128125 A | | 5/2006 |
| JP | 2007109692 A | * | 4/2007 |
| JP | 2008-269947 A | | 11/2008 |
| JP | 2009-164026 A | | 7/2009 |

* cited by examiner

OTHER PUBLICATIONS

Official Communication issued in International Patent Application No. PCT/JP2010/054308, mailed on Jun. 15, 2010.

*Primary Examiner* — Elmito Breval
(74) *Attorney, Agent, or Firm* — Keating & Bennett, LLP

(57) ABSTRACT

Provided is a backlight unit (49) which includes a plurality of LEDs (11). The LEDs (11) are two-dimensionally disposed, thereby having the collection of light emitted from the LEDs (11) in a state of planar light. Furthermore, the backlight unit (49) has the planar light divided into a plurality of sections, and includes a luminance variable system (for instance, a system having disposition which a difference in the density of LEDs (11)), which can change luminance, corresponding to each section.

18 Claims, 29 Drawing Sheets

EX1

EX2

EX3

EX4

EX7

EX8

EX15

EX17

EX18

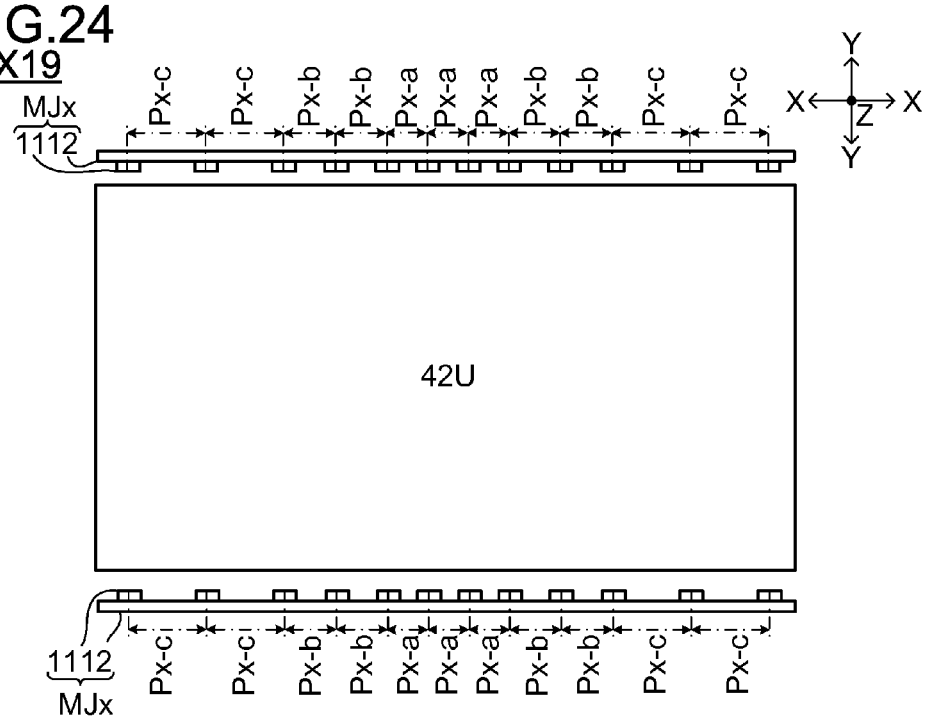
FIG.24 EX19
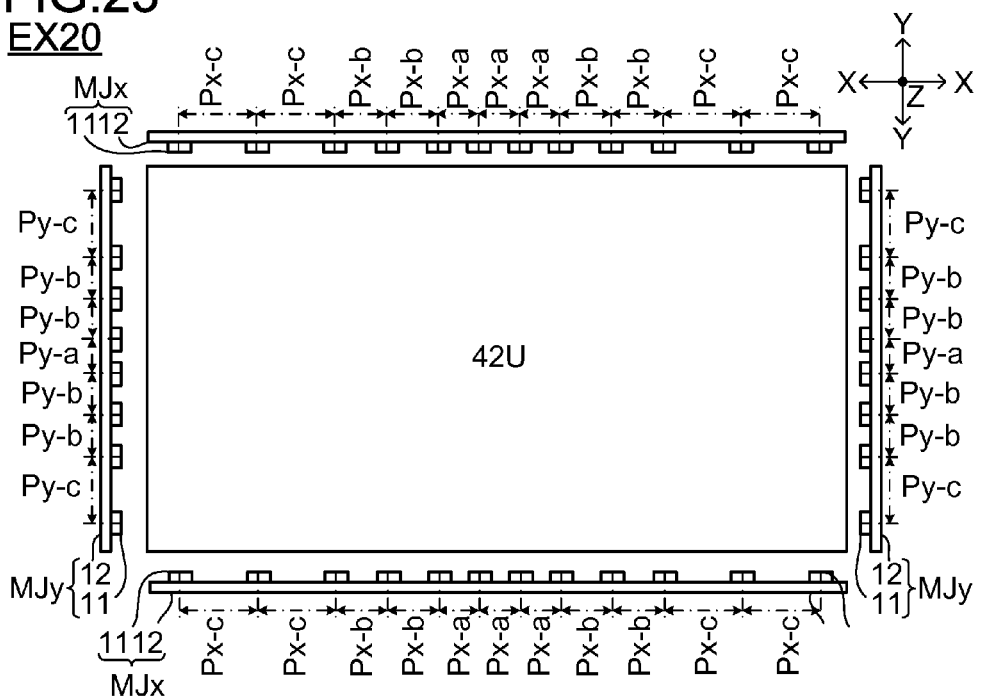
FIG.25 EX20

ILLUMINATING APPARATUS AND DISPLAY APPARATUS

TECHNICAL FIELD

The present invention relates to illuminating apparatus for incorporation in display apparatus such as liquid crystal display apparatus, and to display apparatus themselves.

BACKGROUND ART

A liquid crystal display apparatus (display apparatus) that incorporates a non-luminous liquid crystal display panel (display panel) commonly also incorporates a backlight unit (illuminating apparatus) that supplies light to the liquid crystal display panel. As light sources for use in backlight units, there are many kinds. For example, the backlight unit disclosed in Patent Document 1 listed below employs an LED (light-emitting diode) as a backlight.

In the backlight unit disclosed in Patent Document 1, as shown in FIG. 31, a plurality of LEDs (point light sources) 111 are in a matrix-like lattice arrangement at equal intervals, and the light emitted from them is mixed to produce planar light (in a plan view like FIG. 31, no planar light is illustrated; it should still be interpreted that planar light having a shape similar to the shape around the edge of the group of LEDs 111 in a lattice arrangement is produced). The produced planar light is supplied to the entire surface of a liquid crystal display panel.

LIST OF CITATIONS

Patent Literature

Patent Document 1: JP-A-2006-128125

SUMMARY OF INVENTION

Technical Problem

Nowadays, liquid crystal display panels are becoming increasingly large. The growing size of liquid crystal display panels has to be coped with by increasing the planar size of planar light. Accordingly, the backlight unit disclosed in Patent Document 1 has to use an increased number of LEDs 111, inconveniently resulting in higher cost of the backlight unit and hence the liquid crystal display apparatus.

To reduce cost, a backlight unit may be, as shown in FIG. 32, so deigned as to use less LEDs 111 in a peripheral part of the LEDs 111 in a lattice arrangement in FIG. 31. Inconveniently, however, such a backlight unit suffers from a large difference in luminance between a region including the planar center of the planar light and a peripheral region of the planar light, resulting in lowered uniformity in the luminance of the planar light and hence the image displayed on the liquid crystal display panel.

The present invention has been made to overcome the inconveniences discussed above, and aims to provide an illuminating apparatus etc. that are less costly, through the use of a smaller number of point light sources such as LEDs or through the use of inexpensive LEDs, but that nevertheless can form planar light with high uniformity.

Solution to Problem

In an illuminating apparatus including a plurality of point light sources, the plurality of point light sources are arranged two-dimensionally so that the light therefrom gathers to form planar light. Moreover, in this illuminating apparatus, the planar light is divided into a plurality of sections, and there is provided a luminance-varying system that can vary luminance section by section.

The luminance-varying system is, for example, an arrangement involving a difference in the density of the point light sources. With this design, the density of the plurality of point light sources that produce the planar light is varied appropriately, and thereby the luminance distribution of the planar light is varied (which makes it possible to enhance the uniformity of the planar light). In particular, without increasing the number of point light sources, simply by varying the density of point light sources, it is possible to obtain an illuminating apparatus that produces planar light with enhanced uniformity.

In the illuminating apparatus, preferably, when, of two intersecting directions, one is referred to as the X direction and another is referred to as the Y direction, the illuminating apparatus includes point light sources arranged side by side along the X and Y directions, and there are a plurality of kinds of intervals among the intervals between the point light sources arranged side by side along at least one of the X and Y directions.

More specifically, in one example, X-direction rows in which the point light sources are arranged at same positions with respect to the Y direction and side by side along the X direction are arranged side by side in the Y direction so that the plurality of point light sources are in a lattice-like planar arrangement, and there are a plurality of kinds of intervals among the intervals between the point light sources arranged side by side along at least one of the X and Y directions.

The positions of the point light sources with respect to the X direction between adjacent X-direction rows may be the same from one X-direction row to the next, or the positions of the point light sources with respect to the X direction between adjacent X-direction rows may differ from one X-direction row to the next.

When the rows which are formed as a result of the X-direction rows being arranged side by side in the Y direction and in which the point light sources are arranged at same positions with respect to the X direction and side by side along the Y direction are referred to as the Y-direction rows (for example, when the point light sources are arranged like a matrix), the illuminating apparatus may further include a point light source that is not along either the X-direction rows or the Y-direction rows. With this design, the luminance distribution of the planar light can be varied finely.

In another example, in a backlight unit, one row of the point light sources arranged side by side along the X direction and one row of the point light sources arranged side by side along the Y direction are arranged to form, for example, an L shape, and emit light in different directions so that the light overlaps to form the planar light. In this backlight unit, preferably, there are a plurality of kinds of intervals among the intervals between the point light sources arranged side by side along at least one of the X and Y directions.

Examples in which there are a plurality of kinds of intervals among the intervals between the point light sources include the following two. In a first example, the interval at which a plurality of the point light sources that produce the light near the planar center of the planar light are arranged is shorter than the interval at which a plurality of the point light sources that produce light at periphery elsewhere than near the planar center of the planar light are arranged.

In a second example, the interval at which a plurality of the point light sources that produce light near the planar center of the planar light are arranged is longer than the interval at which a plurality of the point light sources that produce light at periphery elsewhere than near the planar center of the planar light are arranged.

There are still other examples of planar arrangements of a plurality of point light sources. For example, the arrangement surface of the planar arrangement may include a plurality of divided regions divided like a lattice, the point light sources being allocated among those divided regions. Preferably, to produce a difference in the density of the point light sources, there are a plurality of kinds of numbers among the numbers of point light sources located within the divided regions respectively.

For example, when the divided regions in which the point light sources that produce light near the planar center of the planar light are located are referred to as the central divided regions, and the divided regions in which the point light sources that produce light at periphery elsewhere than near the planar center of the planar light are located are referred to as the peripheral divided regions, then the number of point light sources included in each of the central divided regions may be greater than the number of point light sources included in each of the peripheral divided regions, or the number of point light sources included in the peripheral divided regions may be greater than the number of point light sources included in the central divided regions.

The point light sources mentioned above are mounted on a mounting board, and there is no particular restriction on the number of such mounting boards. For example, a plurality of mounting boards may be arranged such that, whereas the intervals at which the point light sources are arranged within each of the mounting boards are equal, the intervals at which the point light sources are arranged differ among the mounting boards.

Also with such mounting boards, incorporating a plurality of them in the illuminating apparatus produces a difference in the density of the point light sources. In addition, these mounting boards each have the same arrangement of point light sources, and can thus be mass-produced extremely easily. This helps reduce the cost of the mounting boards and hence the cost of the illuminating apparatus. Moreover, the mounting boards have a comparatively small size, and are thus easy to handle in the manufacturing process of the illuminating apparatus. Incorporating such mounting boards, the illuminating apparatus can be manufactured easily at reduced cost. Moreover, the size of the illuminating apparatus no longer limits the application of the mounting boards.

Preferably, the plane of the planar light is divided into a plurality of areas by an imaginary line lying on the planar center of the planar light, and the arrangement of a plurality of the point light sources that produce light of the planar light in one of the divided areas and the arrangement of a plurality of the point light sources that produce light of the planar light in another of the divided areas are line-symmetric about the imaginary line.

With this design, in a case where the point light sources are controlled in various ways according to a given algorism, the same sequence of control is repeated, and this helps alleviate the burden of control. Moreover, it is easy to produce the program for the control of the light emission of the point light sources, which affects the luminance distribution of the planar light.

The illuminating apparatus includes a current controller that controls the current values supplied to the point light sources. Preferably, in a case where the point light sources are arranged some at a longer interval and other at a shorter interval, the current controller makes different the current value supplied to the point light sources arranged at a longer interval and the current value supplied to the point light sources arranged at a shorter interval. With this design, it is possible to vary the light emission luminance specific to the point light sources.

Preferably, the current supplied to the point light sources arranged at a longer interval is higher than current supplied to the point light sources arranged at a shorter interval.

With this design, even if a difference in the density of the point light sources (for example, as produced by a group of point light sources arranged at a longer interval) may leave a region with slightly less than sufficient luminance in the luminance distribution of the planar light, the luminance specific to the light from those point light sources that produce light in that region is high. This makes the planar light less likely to have a region with insufficient luminance, and helps reliably enhance the uniformity of the planar light.

The current values supplied to the point light sources need not be relied upon; instead, a difference in the light emission efficiency of the point light sources may be exploited to enhance the uniformity of the planar light. For example, in a case where the point light sources are arranged some at a longer interval and other at a shorter interval, preferably, the light emission efficiency of the point light sources differs between the point light sources arranged at a longer interval and the point light sources arranged at a shorter interval.

When the light emission efficiency of the point light sources arranged at a longer interval is higher than the light emission efficiency of the point light sources arranged at a shorter interval, even if a group of the point light sources arranged at a longer interval may produce a region with less then sufficient luminance in the luminance distribution of the planar light, the light in that region has increased luminance owing to the light of the point light sources with higher light emission efficiency, and this helps reliably increase the uniformity of the planar light.

The luminance-varying system mentioned above is not limited to an arrangement involving a difference in the density of point light sources. For example, even with an arrangement involving no difference in the density of point light sources, if the illuminating apparatus includes a current controller that varies the luminance distribution of the planar light by a difference in the current values supplied to the point light sources, the uniformity of the planar light is enhanced (i.e., the current controller can be said to be a luminance-varying system).

Also, even with an arrangement involving no difference in the density of point light sources, using point light sources with different light emission efficiency among the point light sources that produce the planar light produces a change in the luminance distribution of the planar light. Thus, producing planar light with a group of such point light sources with different light emission efficiency can also be said to be a luminance-varying system.

Display apparatus including an illuminating apparatus as described above and a display panel that receives light emanating from the illuminating apparatus can also be said to be within the scope of the invention.

Advantageous Effects of the Invention

With lighting apparatus according to the present invention, for example, by appropriately varying the density of a plurality of point light sources that produce planar light, the luminance distribution of the planar light is varied, and thereby the uniformity of the planar light can be enhanced. Moreover, enhancing the uniformity of the planar light can be achieved simply by varying the density of point light sources without increasing the number of point light sources, and this suppresses the cost of lighting apparatus.

BRIEF DESCRIPTION OF DRAWINGS

[FIG. 24] is a plan view showing an arrangement of LEDs in Example 19;
[FIG. 25] is a plan view showing an arrangement of LEDs in Example 20.

DESCRIPTION OF EMBODIMENTS

[Embodiment 1]

An embodiment of the present invention will be described below with reference to the accompanying drawings. For convenience' sake, hatching and reference signs are occasionally omitted, in which case any other relevant drawings are to be referred to. Also for convenience' sake, hatching is occasionally used elsewhere than in sectional views. A black dot appearing on arrows indicates the direction perpendicular to the plane of paper.

Figure 17:
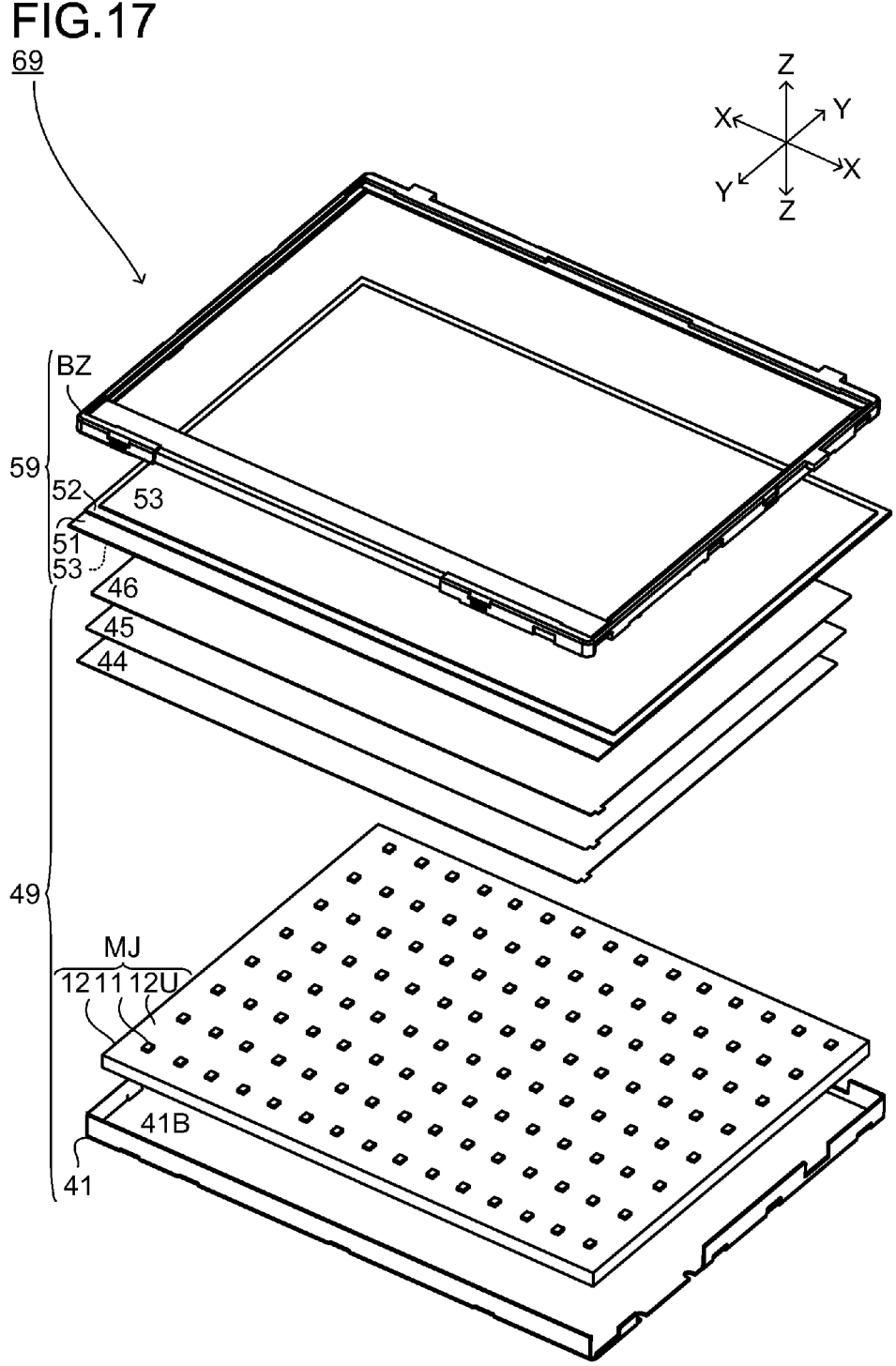
[FIG. 17] is an exploded perspective view of a liquid crystal display apparatus.

FIG. 17 is an exploded perspective view of a liquid crystal display apparatus. As shown there, the liquid crystal display apparatus 69 includes a liquid crystal display panel 59 and a backlight unit (illuminating apparatus) 49 which supplies light to the liquid crystal display panel 59.

The liquid crystal display panel 59 includes an active matrix substrate 51 and a counter substrate 52, between which liquid crystal (not shown) is filled (these substrates 51 and 52 are fit in a frame-like bezel BZ). On the active matrix substrate 51, gate signal lines and source signal lines (not shown) are arranged to intersect (cross) each other, and at the intersections between those signal lines, switching devices (for example, thin-film transistors) are arranged for adjustment of the voltage applied to the liquid crystal.

A polarizing film 53 is fitted on the light-input side of the active matrix substrate 51, and another polarizing film 53 is fitted on the light-output side of the counter substrate 52 The liquid crystal display panel 59 described above displays an image by exploiting the variation of transmittance resulting from the inclination of liquid crystal molecules.

Next, a description will be given of the backlight unit 49, which is located directly under the liquid crystal display panel 59 and which supplies light (backlight BL) to the liquid crystal display panel 59. The backlight unit 49 includes an LED module (light-emitting module) MJ, a backlight chassis 41, a diffusive sheet 44, a prism sheet 45, and a prism sheet 46.

The LED module MJ includes a mounting board 12 and an LED (light-emitting diodes) 11.

The mounting board 12 is, for example, a rectangular board, and has a plurality of electrodes (not shown) arranged on a mounting surface 12U. On these electrodes, LEDs 11, as light-emitting devices, are fitted. The electrodes are arranged along two intersecting (for example, mutually perpendicular) directions (that is, they are in a lattice arrangement) on the mounting surface 12U of a single mounting board 12.

Figure 18:
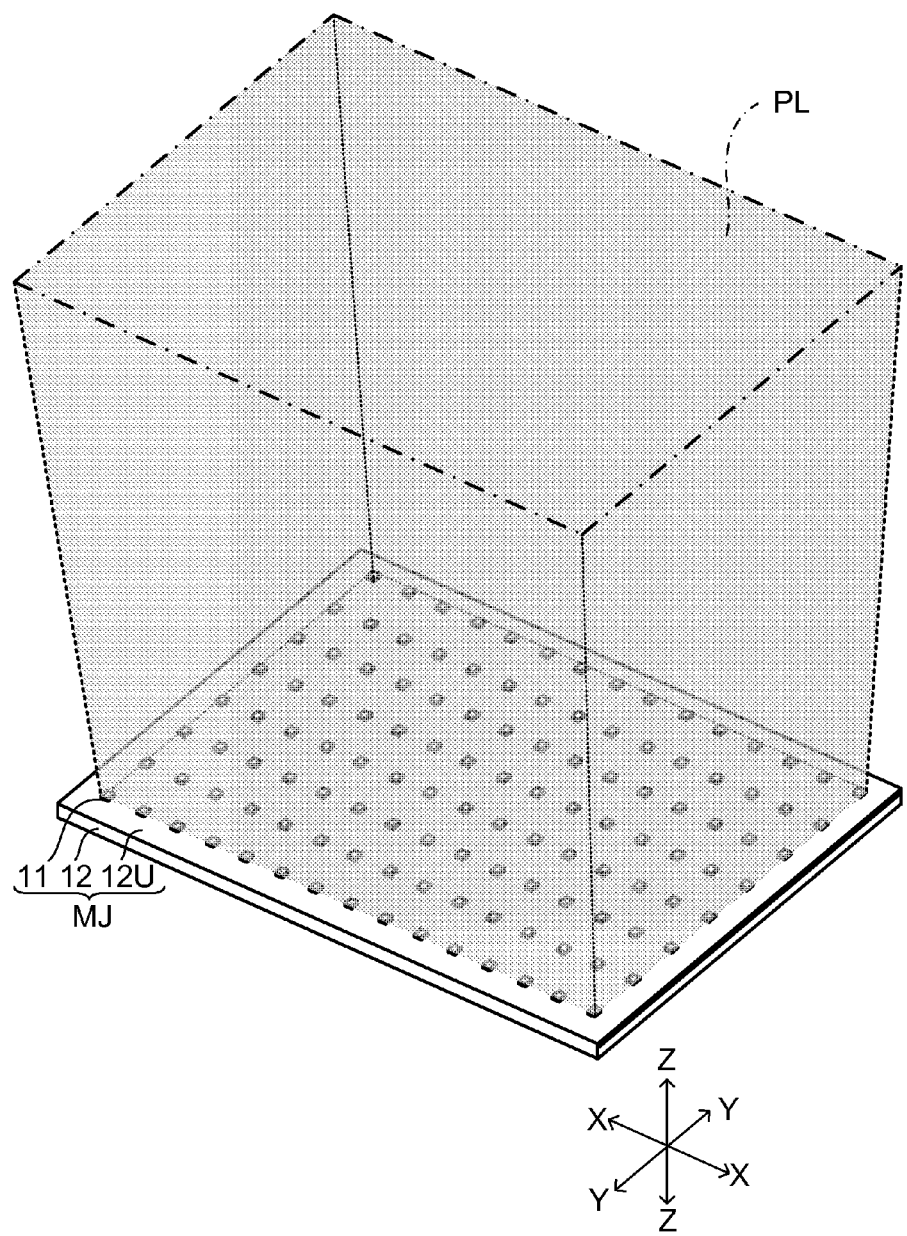
[FIG. 18] is a perspective view showing how planar light is produced.

Thus, the LEDs 11 are fitted on the electrodes as shown in FIG. 18, and when the LEDs 11 emit light, the light from the plurality of LEDs 11 gathers to form planar light PL. With respect to the arrangement of the electrodes (and hence the LEDs 11), of the two intersecting directions, the one along which the larger number of electrodes are arranged side by side will be referred to as the X direction, and the other along which the smaller number of them are arranged will be referred to as the Y direction; the direction intersecting both the X and Y directions will be referred to as the Z direction (the X direction corresponds to the longer sides of the screen of the liquid crystal display panel 59, and the Y direction corresponds to the shorter sides of the screen of the liquid crystal display panel 59).

The LED 11 is a light sources (light-emitting device, point light source), and emits light by receiving electric current via the electrodes on the mounting board 12. The LED 11 may be of any of many various types. For example, the LED 11 may be one including a blue-light-emitting LED chip (light-emitting chip) combined with a phosphor (fluorescent substance) receiving the light from the LED chip and emitting yellow light by fluorescence (there is no particular restriction on the number of LED chips). This LED 11 produces white light by mixing the light from the blue-light-emitting LED chip with the fluorescent light (an LED 11 emitting white light is occasionally referred to as an LED 11W).

The LED 11 may include no phosphor at all. In that case, the LED 11W includes a red LED chip emitting red light, a green LED chip emitting green light, and a blue LED chip emitting blue light, and produces white light by mixing together the light from all those LED chips.

The LED 11 does not necessarily have to be a white-light LED 11W; it may instead be, for example, a combination of a red-light-emitting LED 11R, a green-light-emitting LED 11G, and a blue-light-emitting LED 11B. In that case, it is preferable that these red-light-emitting, green-light-emitting, and blue-light-emitting LEDs 11R, 11G, and 11B be arranged comparatively close together so that the light from them may mix to produce white light.

As shown in FIG. 17, the backlight chassis 41 is a box-like member, and accommodates the LED module MJ on its bottom surface 41B. The bottom surface 41B of the backlight chassis 41 and the mounting board 12 of the LED module MJ are fastened together, for example, by rivets (not shown).

The diffusive sheet 44 is a flat optical sheet which is laid over the mounting surface 12U over which the LEDs 11 are mounted. The diffusive sheet 44 receives the light emitted from the LED module MJ and diffuses it. That is, the diffusive sheet 44 diffuses the planar light formed by the LED module MJ to illuminate the entire area of the liquid crystal display panel 59.

The prism sheets 45 and 46 are optical sheets which have prism shapes within the sheet plane and which deflect the radiation characteristics of light, and are so located as to cover the diffusive sheet 44. Thus, the prism sheets 45 and 46 condense the light emanating from the diffusive sheet 44 and increase its luminosity. The directions in which the light condensed by the prism sheets 45 and 46, respectively, is made to diverge are in an intersecting relationship.

The backlight unit 49 described above shines the planar light formed by the LED module MJ through the plurality of optical sheets 44 to 46 to supply it to the liquid crystal display panel 59. Thus, receiving backlight BL from the backlight unit 49, the non-luminous liquid crystal display panel 59 provides enhanced display performance.

Figure 19:
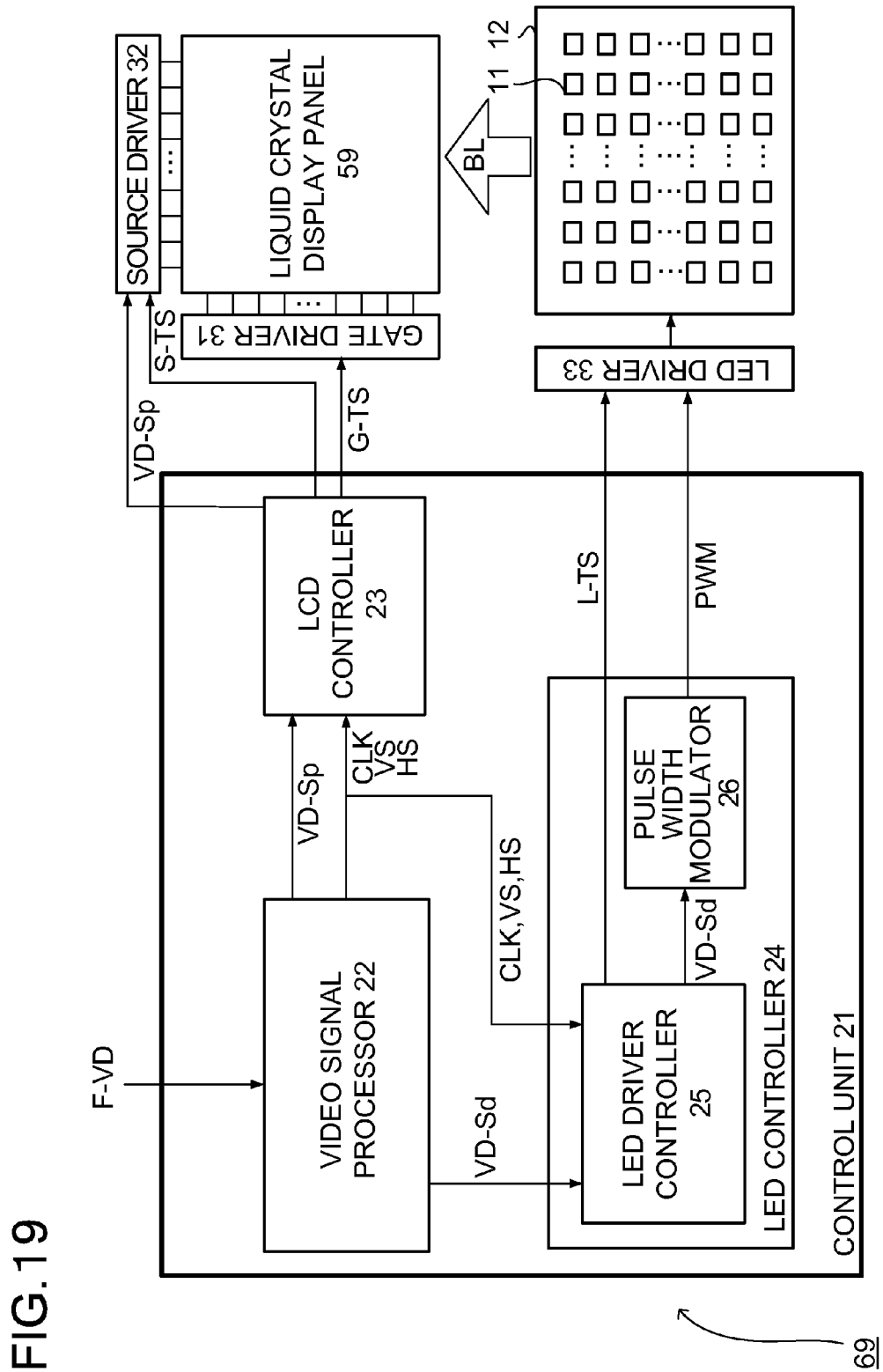
[FIG. 19] is a block diagram showing various members included in a liquid crystal display apparatus.

As shown in a block diagram in FIG. 19, the liquid crystal display apparatus 69 described above includes a control unit 21, and the control unit 21 comprehensively controls the liquid crystal display apparatus 69 (that is, the liquid crystal display panel 59 and the backlight unit 49).

More specifically, the control unit 21 includes a video signal processor 22, a liquid crystal panel controller (LCD controller) 23, and an LED controller 24 (the liquid crystal display apparatus 69 includes a gate driver 31, a source driver 32, and an LED driver 33, which will be described later)

The video signal processor 22 receives an initial image signal (initial image signal F-VD) from an external signal source. The initial image signal F-VD is, for example, a television signal, and includes a video signal and a synchronizing signal synchronous with the video signal (the video signal is composed of, for example, a red video signal, a green video signal, a blue video signal, and a luminance signal).

From the synchronizing signal, the video signal processor 22 generates new synchronizing signals (a clock signal CLK, a vertical synchronizing signal VS, a horizontal synchronizing signal HS, etc.) for image display on the liquid crystal display panel 59. The video signal processor 22 then transmits the generated new synchronizing signals to the LCD controller 23 and the LED controller 24.

The video signal processor 22 splits the received initial image signal F-VD into a signal VD-Sp suitable for the driving of the liquid crystal display panel 59 and a signal VD-Sd suitable for the driving of the backlight unit 49 (more specifically, the LEDs 11). The video signal processor 22 then transmits the separator signal VD-Sp to the LCD controller 23 and the separator signal VD-Sd to the LED controller 24.

From the clock signal CLK, the vertical synchronizing signal VS, the horizontal synchronizing signal HS, etc. transmitted from the video signal processor 22, the LCD controller 23 generates timing signals for controlling the gate driver 31 and the source driver 32 (the timing signal corresponding to the gate driver 31 will be referred to as the timing signal G-TS, and the timing signal corresponding to the source driver 32 will be referred to as the timing signal S-TS).

On one hand, the LCD controller 23 transmits the timing signal G-TS to the gate driver 31; on the other hand, the LCD controller 23 transmits the timing signal S-TS and the separator signal VD-Sp to the source driver 32.

Thus, by using the two timing signals G-TS and S-TS and the separator signal VD-Sp, the source driver 32 and the gate driver 31 control the image on the liquid crystal display panel 59.

The LED controller 24 includes an LED driver controller 25 and a pulse width modulator 26.

The LED driver controller 25 transmits the separator signal VD-Sd received from the video signal processor 22 to the pulse width modulator 26. The LED driver controller 25 also generates from the synchronizing signals (the clock signal CLK, the vertical synchronizing signal VS, the horizontal synchronizing signal HS, etc.) a lighting timing signal L-TS for the LEDs 11 and transmits it to the LED driver 33.

Based on the received separator signal VD-Sd, the pulse width modulator 26 adjusts the light emission duration of the LEDs 11 by a pulse width modulation (PWM) method (a signal used in such pulse width modulation is referred to as a PWM signal). More specifically, the pulse width modulator 26 transmits a PWM signal suitable for the light emission control of the LEDs 11 to the LED driver 33.

Thus, based on the signals (the PWM signal and the timing signal L-TS) from the LED controller 24, the LED driver 33 controls the lighting of the LEDs 11.

Now, a description will be given of the arrangement of the LEDs 11 included in the liquid crystal display apparatus 69, in particular the backlight unit 49, described above (the control unit 21, which controls the light emission of the LEDs 11, can not only control all the LEDs 11 collectively but also control them individually; that is, it has a so-called local dimming function).

Figure 1:
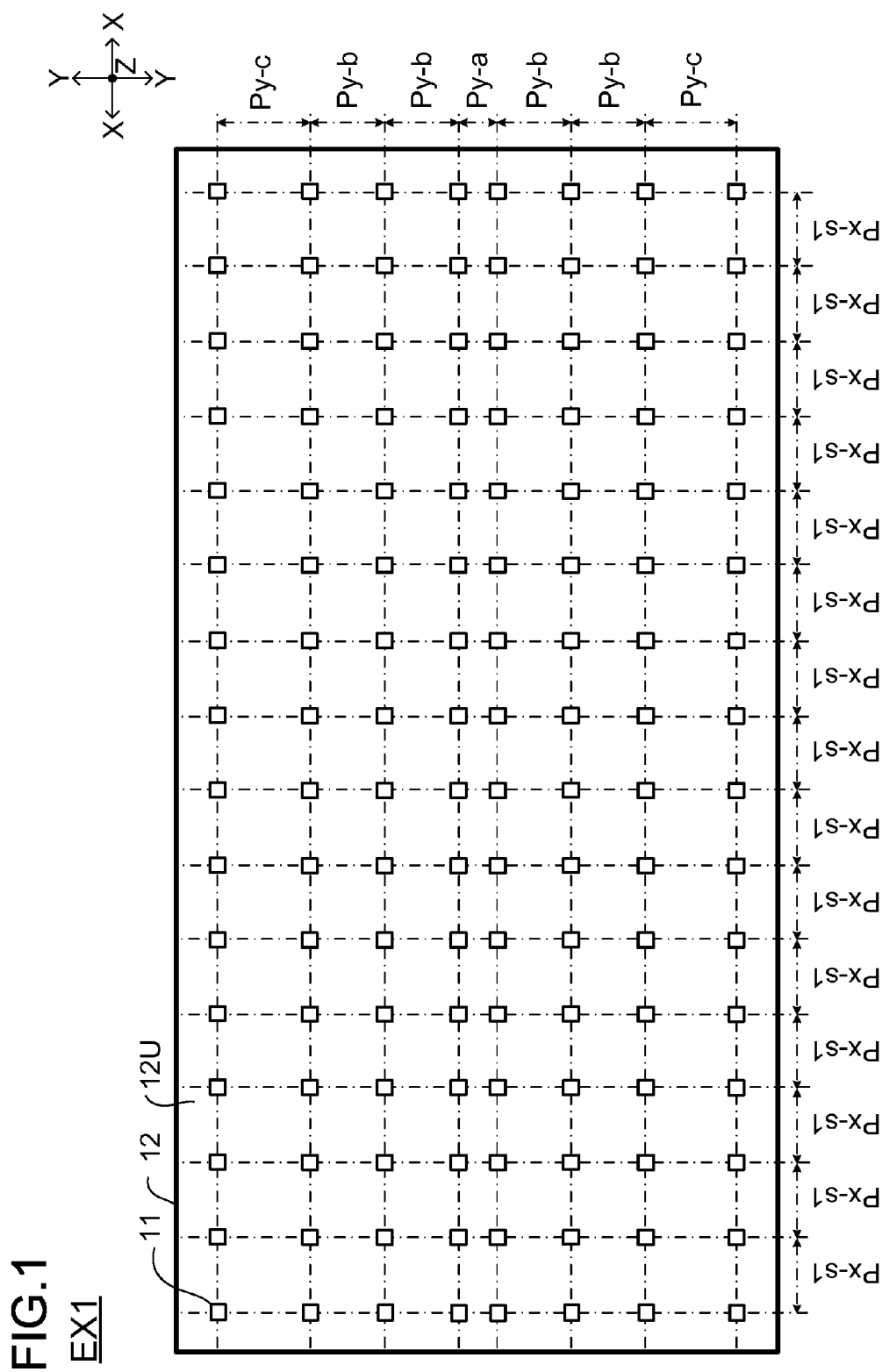
[FIG. 1] is a plan view showing an arrangement of LEDs in Example 1.

As shown in FIG. 18, simply arranging the plurality of LEDs 11 two-dimensionally permits the light from them to gather into planar light. Here, the LEDs 11 can be arranged two-dimensionally in many ways. FIG. 1 shows one example of how the LEDs 11 are arranged (in a plan view like FIG. 1, no planar light is illustrated; it should still be interpreted that planar light having a shape similar to the shape around the edge of the group of LEDs 11 in a lattice arrangement is produced).

More specifically, in the backlight unit 49 shown in FIG. 1 (Example 1), rows (X-direction rows) in which LEDs 11 are arranged at the same positions with respect to the Y direction and side by side along the X direction are arranged side by side in the Y direction so that a plurality of LEDs 11 are in a lattice-like (like a lattice forming a matrix) planar arrangement. In other words, rows (Y-direction rows) in which LEDs 11 are arranged at the same positions with respect to the X direction and side by side along the Y direction are arranged side by side in the X direction so that a plurality of LEDs 11 are in a lattice-like planar arrangement.

Moreover, whereas the intervals between the Y-direction rows are equal, namely Px-s1, the intervals between the X-direction rows are not equal (that is, there are a plurality of kinds of intervals among the intervals between the X-direction rows). Specifically, the interval between the X-direction rows corresponding to near the planar center of the planar light is shorter than the interval between the X-direction rows corresponding to other than near the planar center of the planar light.

For example, as shown in FIG. 1, in a group of LEDs 11 in a lattice arrangement with 16 of them in the X direction and 8 of them in the Y direction, the two X-direction rows located fourth from the two outermost rows in the Y direction produce the light near the planar center of the planar light (whereas the other X-direction rows than those two produce the light elsewhere than near the planar center of the planar light). Thus, the interval Py-a between those two X-direction rows is shorter than the intervals Py-b and Py-c between the other adjacent X-direction rows (the intervals having the relationship interval Py-a<interval Py-b<interval Py-c).

With this lattice arrangement, the planar light has higher luminance near the planar center than in a region elsewhere than near the center ("near the planar center" denotes "an arbitrary region including the center of the plane of the planar light"). With this planar light, owing to the characteristics of the human visual sense, almost no lowering in luminance is perceived in a region elsewhere than at the planer center of the planar light (and hence the liquid crystal display panel 59 receiving the planar light). That is, the entire planar light is perceived to have uniform luminance (the planar light has comparatively high uniformity).

This helps reduce the number of LEDs 11 corresponding to the region other than the planar center of the planar light. Specifically, for example, consider a case where such planar light is needed as would be obtained when LEDs 11 were arranged at equal intervals in the X and Y directions, with 18 of them in the X direction and 10 of them in the Y direction. Providing a plurality of kinds of intervals among the intervals between the LEDs 11 in the Y direction makes it less likely for humans to perceive a significant difference in the luminance of the planar light even when the LEDs 11 are in a lattice arrangement with 16 of them in the X direction and 8 of them in the Y direction as shown in FIG. 1.

That is, in the backlight unit 49, the LEDs 11 are so arranged that humans perceive the entire planar light to have uniform luminance. Accordingly, in the backlight unit 49, the planar light is divided into a plurality of sections, and a plurality of LEDs 11 are arranged on such a principle that luminance is varied section by section (an arrangement of LEDs 11 that divides planar light into a plurality of sections and that permits luminance to be varied for each of those sections will be referred to as a luminance-varying system, which can thus produce planar light in many ways to suit various purposes).

For example, when the LEDs 11 are arranged as shown in FIG. 1, the planar light is divided into a section (central section) in a region extending in the X direction and a section (peripheral section) in the region other than that region. Here, the interval Py-a between the X-direction rows that produce the light corresponding to the central region is made shorter than the intervals Py-b and Py-c between the other X-direction rows. That is, the plurality of LEDs 11 are arranged with a difference in density (the distribution density of the LEDs 11). This permits humans to perceive the entire planar light to have uniform luminance.

In a case where the planar light is divided into a central section in a region including the planar center and a peripheral section in the other region, the peripheral section may be further divided into a plurality of subsections. The intervals between the LEDs 11 that produce the light in the divided subsections may differ from one peripheral subsection to another (for example, when the LEDs 11 are arranged as shown in FIG. 1, the interval Py-b between the X-direction rows corresponding to the peripheral subsection near the central section is shorter than the interval Py-c between the X-direction rows corresponding to the other peripheral subsection).

Arranging the LEDs 11 in this way makes flexible the luminance distribution of the planar light within the plane, and thus more reliably permits humans to perceive the entire planar light to have uniform luminance.

For the purpose of permitting humans to perceive the entire planar light to have uniform luminance, the LEDs 11 may be arranged not only as shown in FIG. 1, which shows Example 1 (EX 1), but in many other ways. For one example, the LEDs 11 may be arranged as shown in FIG. 2 (Example 2).

More specifically, whereas the intervals between the X-direction rows are equal, namely Py-s1, the intervals between the Y-direction rows are not equal (that is, there are a plurality of kinds of intervals among the intervals between the Y-direction rows). Specifically, the interval between the Y-direction rows corresponding to near the center of the planar light is shorter than the interval between the Y-direction rows corresponding to elsewhere than near the center of the planar light.

Figure 2:
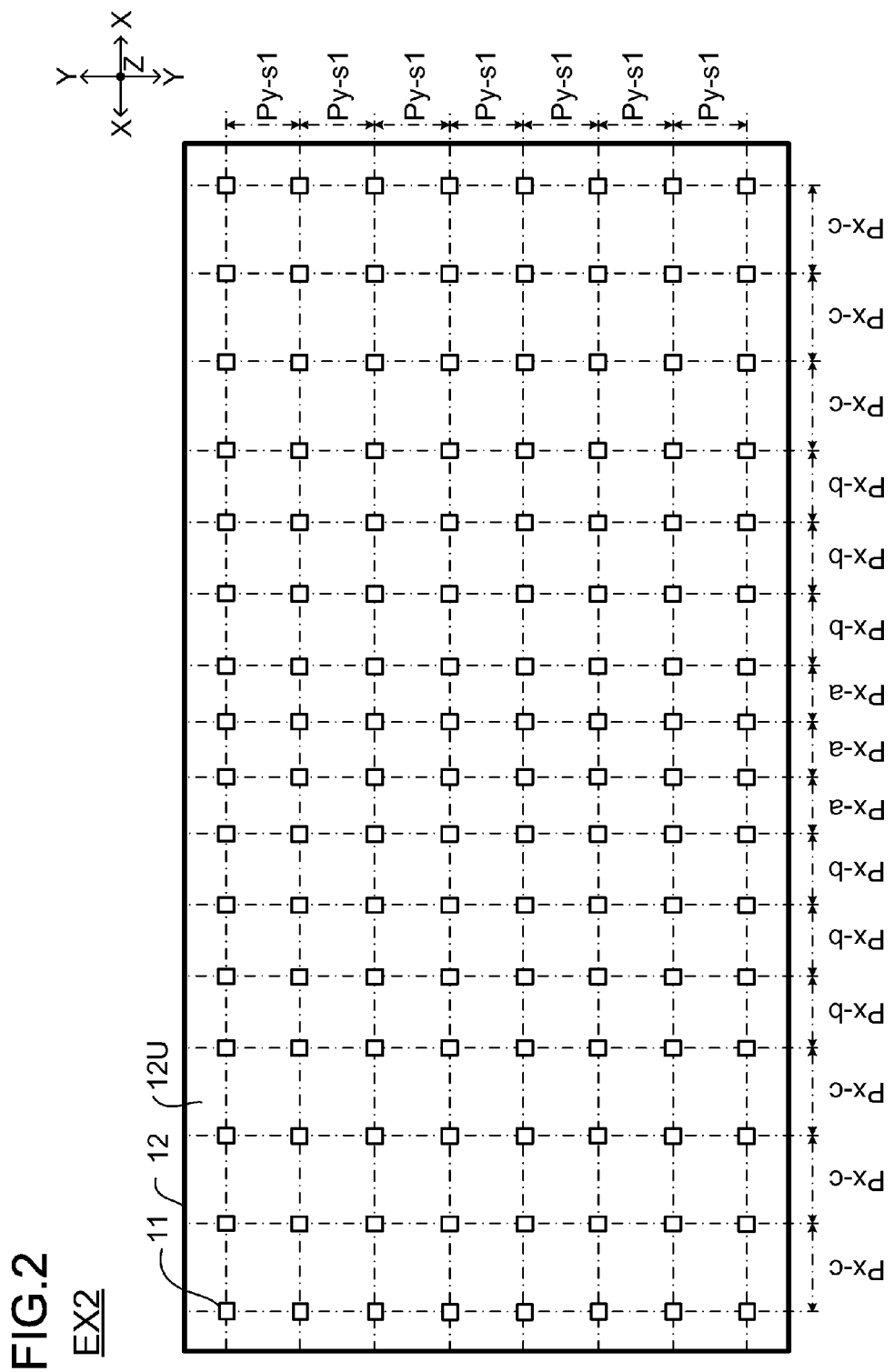
[FIG. 2] is a plan view showing an arrangement of LEDs in Example 2.

For example, as shown in FIG. 2, in a group of LEDs 11 in a lattice arrangement with 16 of them in the X direction and 8 of them in the Y direction, the four Y-direction rows located seventh and eighth from the two outermost rows in the X direction produce the light near the planar center of the planar light (whereas the other Y-direction rows than those four produce the light elsewhere than near the planar center of the planar light). Thus, the interval Px-a between those four Y-direction rows is shorter than the intervals Px-b and Px-c between the other adjacent Y-direction rows (the intervals having the relationship interval Px-a<interval Px-b<interval Px-c).

That is, when the LEDs 11 are arranged in this way, the planar light is divided into a section (central section) in a region extending in the Y direction and a section (peripheral section) in the region other than that region. Here, the interval Px-a between the Y-direction rows that produce the light corresponding to the central region is made shorter than the intervals Px-b and Px-c between the other Y-direction rows, and this permits humans to perceive the entire planar light to have uniform luminance.

Figure 3:
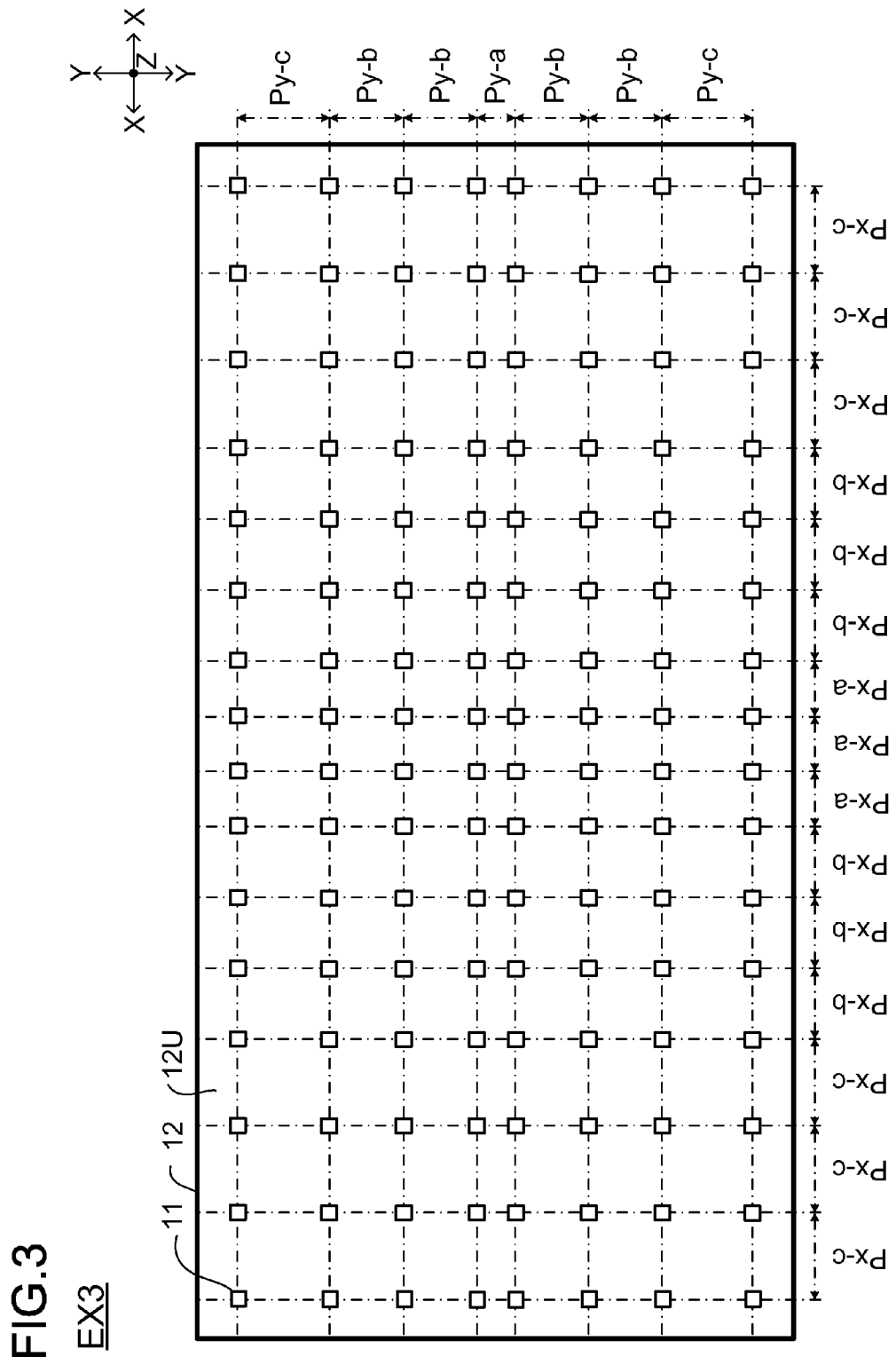
[FIG. 3] is a plan view showing an arrangement of LEDs in Example 3.

The LEDs 11 may be arranged as shown in FIG. 3 (Example 3). More specifically, the intervals between the X-direction rows are not equal, nor are the intervals between the Y-direction rows (that is, there are a plurality of kinds of intervals among the intervals between the X-direction rows, and there are a plurality of kinds of intervals among the intervals between the Y-direction rows).

Specifically, the interval between the X-direction rows corresponding to near the center of the planar light is shorter than the interval between the X-direction rows corresponding to elsewhere than near the center of the planar light, and in addition the interval between the Y-direction rows corresponding to near the center of the planar light is shorter than the interval between the Y-direction rows corresponding to elsewhere than near the center of the planar light.

Thus, the arrangement of the LEDs 11 in FIG. 3 is, so to speak, a mixture of the arrangements of the LEDs 11 in FIGS. 1 and 2. Accordingly, in a group of LEDs 11 in a lattice arrangement with 16 of them in the X direction and 8 of them in the Y direction, the two X-direction rows located fourth from the two outermost rows in the Y direction and the four Y-direction rows located seventh and eighth from the two outermost rows in the X direction produce the light near the planar center of the planar light (whereas the LEDs 11 in the rows other than those just mentioned produce the light elsewhere than near the planar center of the planar light).

Here, the interval Py-a between the two X-direction rows located fourth from the two outermost rows in the Y direction is shorter than the intervals Py-b and Py-c between the other adjacent X-direction rows. In addition, the interval Px-a between the four Y-direction rows located seventh and eighths from the two outermost rows in the X direction is shorter than the intervals Px-b and Px-c between the other adjacent Y-direction rows.

That is, in a case where LEDs 11 are arranged in intersecting X and Y directions, there may be a plurality of kinds of intervals among the intervals between the LEDs 11 arranged in the two, X and Y, directions (i.e., there need to be a plurality of kinds of intervals among the intervals between the LEDs 11 arranged in at least one of the X and Y directions). Also this arrangement of the LEDs 11 permits, like those of Examples 1 and 2, humans to perceive the entire planar light to have uniform luminance.

In the lattice arrangements of the LEDs 11 shown in FIGS. 1 to 3, the positions of the LEDs 11 with respect to the X direction between adjacent X-direction rows are the same from one X-direction row to the next (in other words, the positions of the LEDs 11 with respect to the Y direction between adjacent Y-direction rows are the same from one Y-direction row to the next). Thus, the shape of the sections defined by the dash-and-dot lines indicating the X- and Y-direction rows (the shape of each segment of the lattice) is rectangular.

Figure 4:
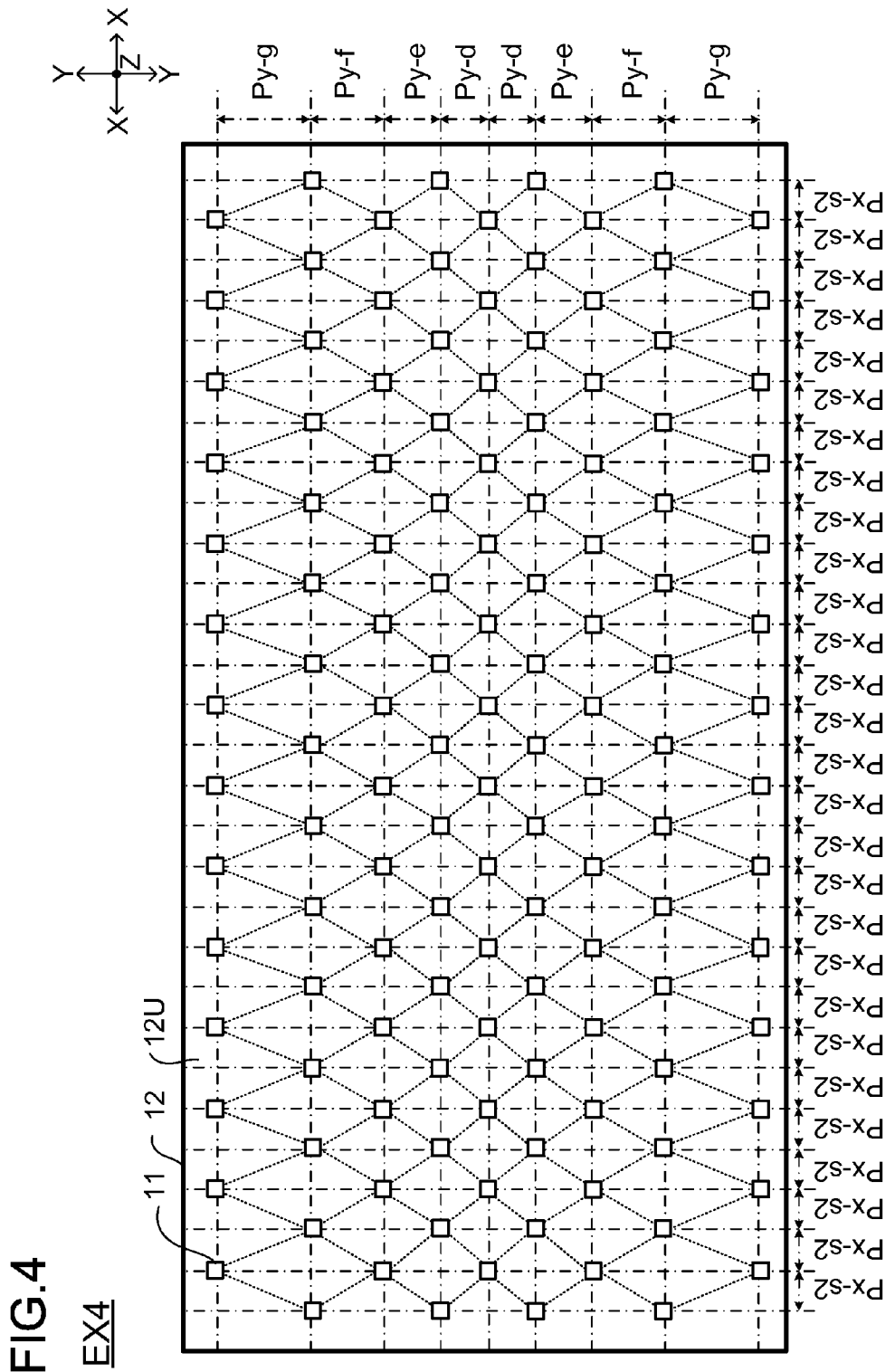
[FIG. 4] is a plan view showing an arrangement of LEDs in Example 4.

The arrangement of the LEDs 11 is, however, not limited to matrix-like lattice arrangements as shown in FIGS. 1 to 3. The LEDs 11 may instead be arranged, for example, in a staggering lattice arrangement as shown in FIG. 4 (Example 4). That is, the positions of the LEDs 11 with respect to the X direction between adjacent X-direction rows may differ from one X-direction row to the next (in other words, the positions of the LEDs 11 with respect to the Y direction in adjacent Y-direction rows may differ from one Y-direction row to the next).

More specifically, whereas the intervals between the Y-direction rows are equal, namely Px-s2, the intervals between the X-direction rows are not equal. Specifically, as in FIG. 1, the interval between the X-direction rows corresponding to near the planar center of the planar light is shorter than the interval between the X-direction rows corresponding to elsewhere than near the planar center of the planar light.

For example, as shown in FIG. 4, starting at one outermost row in the Y direction, X-direction rows with 14 LEDs 11 and X-direction rows with 15 LEDs 11 are arranged alternately side by side in the Y direction to form a lattice arrangement composed of a total of nine X-direction rows. In this group of LEDs 11 in a lattice arrangement, the three X-direction rows located fourth, fifth, and sixth from one outermost row in the Y direction produce the light near the planar center of the planar light (whereas the X-direction rows other than those three produce the light elsewhere than near the planar center of the planar light). Thus, the interval Py-d between those three X-direction rows is shorter than the intervals Py-e, Py-f, and Py-g between the other adjacent X-direction rows (the intervals having the relationship interval Py-d<interval Py-e<interval Py-f<interval Py-g).

That is, when the LEDs 11 are arranged as shown in FIG. 4, the planar light is divided into a section (central section) in a region including the planar center and extending in the X direction and a section (peripheral section) in the region other than that region. The interval Py-d between the X-direction rows that produce the light corresponding to the central section is made shorter than the intervals between the other X-direction rows (intervals Py-e, Py-f, and Py-g). This permits humans to perceive the entire planar light to have uniform luminance.

Figure 5:
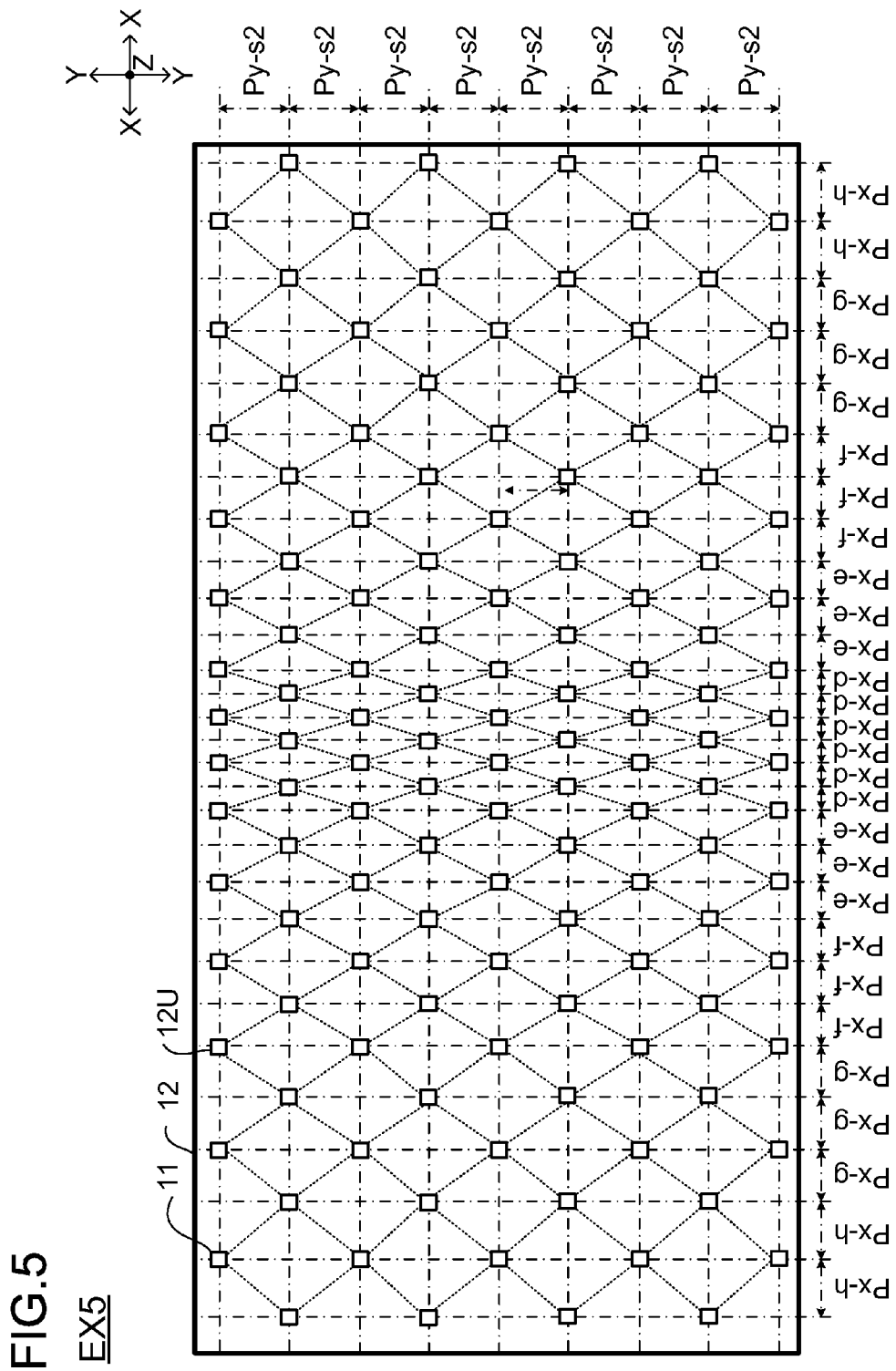
[FIG. 5] is a plan view showing an arrangement of LEDs in Example 5.

The LEDs 11 may be arranged as shown in FIG. 5 (Example 5). More specifically, whereas the intervals between the X-direction rows are equal, namely Py-s2, the intervals between the Y-direction rows are not equal. Specifically, the interval between the Y-direction rows corresponding to near the center of the planar light is shorter than the interval between the Y-direction rows corresponding to elsewhere than near the center of the planar light.

For example, as shown in FIG. 5, starting at one outermost row in the X direction, Y-direction rows with four LEDs 11 and Y-direction rows with five LEDs 11 are arranged alternately side by side in the X direction to form a lattice arrangement composed of a total of 29 Y-direction rows. In this group of LEDs 11 in a lattice arrangement, the seven Y-direction rows located 12th to 18th from one outermost row in the X direction produce the light near the planar center of the planar light (whereas the Y-direction rows other than those seven produce the light elsewhere than near the planar center of the planar light). Thus, the interval Px-d between those seven Y-direction rows is shorter than the intervals Px-e, Px-f, Px-g, and Px-h between the other adjacent X-direction rows (the intervals having the relationship interval Px-d<interval Px-e<interval Px-f<interval Px-g<interval Px-h).

That is, when the LEDs 11 are arranged in this way, the planar light is divided into a section (central section) in a region including the planar center and extending in the Y direction and a section (peripheral section) in the region other than that region. The interval Px-d between the Y-direction rows that produce the light corresponding to the central section is made shorter than the intervals between the other Y-direction rows (intervals Px-e, Px-f, Px-g, and Px-h). This permits humans to perceive the entire planar light to have uniform luminance.

Figure 6:
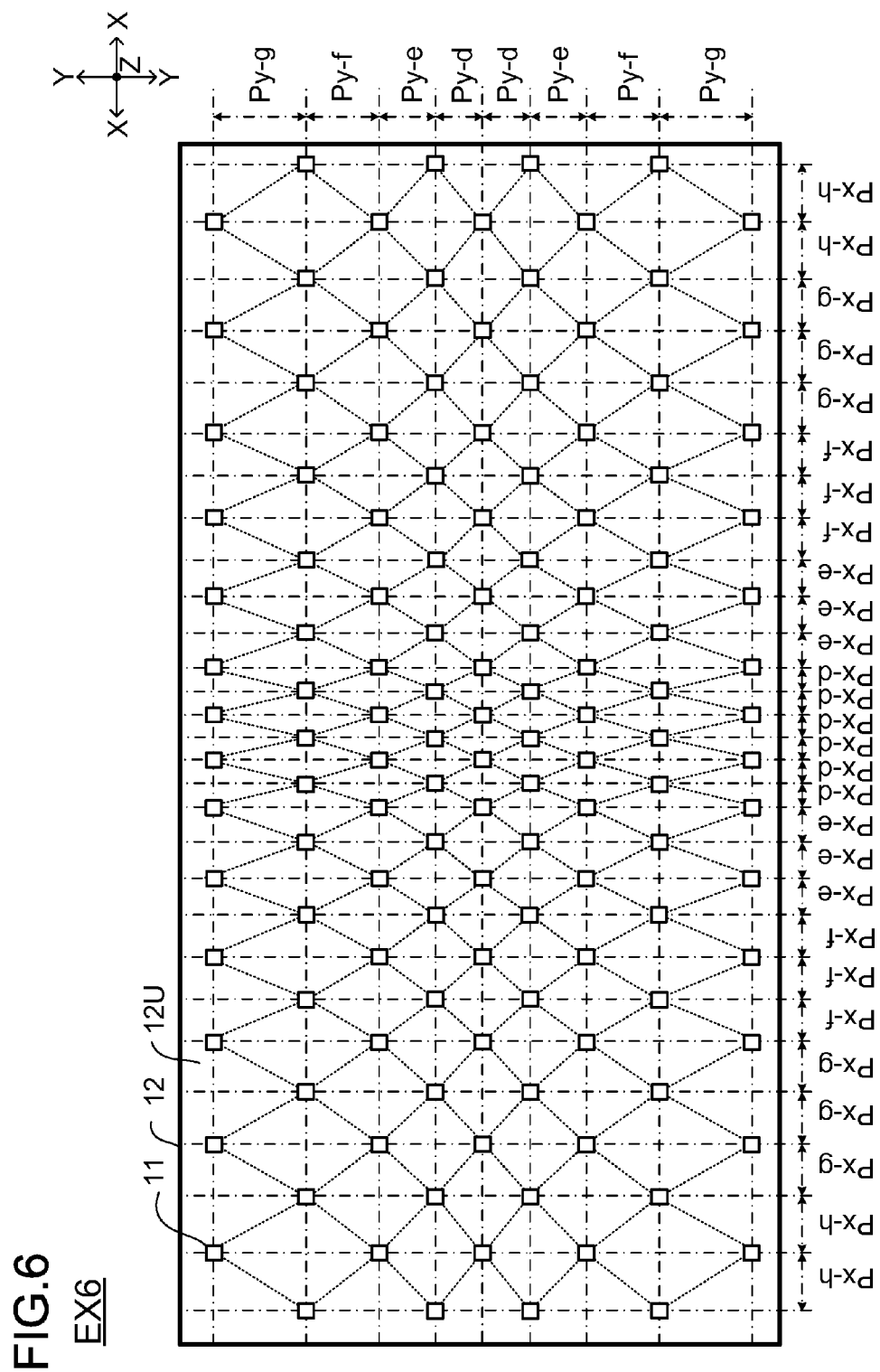
[FIG. 6] is a plan view showing an arrangement of LEDs in Example 6.

The LEDs 11 may be arranged as shown in FIG. 6 (Example 6). More specifically, the LEDs 11 are arranged in a lattice arrangement in which the positions of the LEDs 11 with respect to the X direction between adjacent X-direction rows differ from one X-direction row to the next and in addition the positions of the LEDs 11 with respect to the Y direction between adjacent Y-direction rows differ from one Y-direction row to the next. Thus, the intervals between the X-direction rows are not equal, nor are the intervals between the Y-direction rows.

Specifically, the interval between the X-direction rows corresponding to near the center of the planar light is shorter than the interval between the X-direction rows corresponding to other than near the center of the planar light, and in addition the interval between the Y-direction rows corresponding to near the center of the planar light is shorter than the interval between the Y-direction rows corresponding to elsewhere than near the center of the planar light.

Thus, the arrangement of the LEDs 11 in FIG. 6 is, so to speak, a mixture of the arrangements of the LEDs 11 in FIGS. 4 and 5. More specifically, X-direction rows with 14 LEDs 11 and X-direction rows with 15 LEDs 11 are arranged alternately side by side in the Y direction to form a lattice arrangement composed of a total of nine X-direction rows (in other words, Y-direction rows with four LEDs 11 and Y-direction rows with five LEDs 11 are arranged alternately side by side in the X direction to form a lattice arrangement composed of a total of 29 Y-direction rows).

In this group of LEDs 11 in a lattice arrangement, the three X-direction rows located fourth, fifth, and sixth from one outermost row in the Y direction and the seven Y-direction rows located 12th to 18th from one outermost row in the X direction produce the light near the planar center of the planar light (whereas the LEDs 11 in the rows other than those just mentioned produce the light elsewhere than near the planar center of the planar light).

Thus, the interval Py-d between the three X-direction rows located at fourth, fifth, and sixth from one outermost row in the Y direction is shorter than the intervals Py-e, Py-f, and Py-g between the other adjacent X-direction rows. In addition, the interval Px-d between seven Y-direction rows located at 12th to 18th from one outermost row in the X direction is shorter than the intervals Px-e, Px-f, Px-g, and Px-h between the other adjacent X-direction rows.

That is, in a case where LEDs 11 are arranged in intersecting X and Y directions, there may be a plurality of kinds of intervals among the intervals between the LEDs 11 arranged in the two, X and Y, directions. Also this arrangement of the LEDs 11 permits, like those of Examples 5 and 6, humans to perceive the entire planar light to have uniform luminance.

Figure 7:
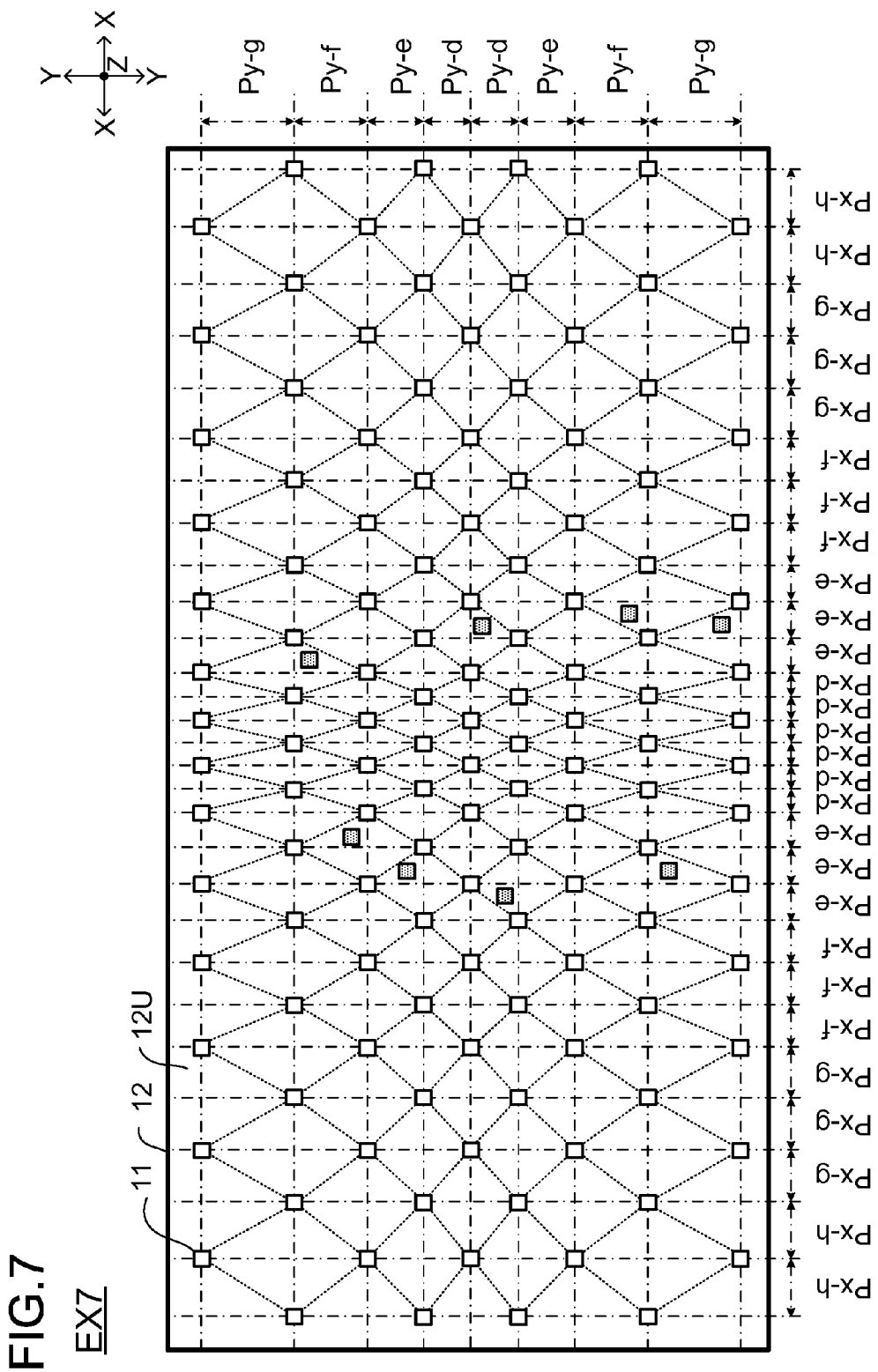
[FIG. 7] is a plan view showing an arrangement of LEDs in Example 7.

As shown in FIG. 7 (Example 7), a group of LEDs 11 in a staggered arrangement may further include one or more LEDs (hatched by dots) that are not included in any X- or Y-direction row. Even a group of LEDs 11 in a matrix-like arrangement as shown in FIGS. 1 to 3 may include one or more LEDs that are not included in any X- or Y-direction row. Providing such irregularly arranged LEDs 11 increases flexibility in the adjustment of the luminance of the planar light (i.e., makes finer luminance adjustment possible).

For a liquid crystal display apparatus 69 with a 52-inch screen, comparing the number of LEDs 11 arranged at irregular pitches in the Y direction as in Example 1 with the number of LEDs arranged at equal intervals in both X and Y directions reveals that the number of LEDs 11 in Example 1 is as small as approximately 83% of the number in the compared arrangement.

In one specific example, whereas, in the compared arrangement, 24 LEDs in the X direction and 12 LEDs in the Y direction, and thus a total of 288 LEDs, are arranged, in Example 1, the LEDs in each outermost X-direction row (and thus a total of two X-direction rows) are eliminated and the remaining 240 (24×10) LEDs are arranged unequally.

When the intervals at which the LEDs are arranged in the compared arrangement is compared with the shorter intervals (for example, the interval Py-a) at which the LEDs 11 are arranged in Example 1, the latter is shorter.

[Embodiment 2]

A second embodiment of the invention will now be described. Such members as have similar functions to those used in Example 1 are identified by the same reference signs, and no overlapping descriptions will be repeated.

The arrangement of the LEDs 11 in Embodiment 1 has as its purpose to permit humans to perceive the entire planar light to have uniform luminance. It may be for another purpose, for example to obtain increased luminance in a particular region in planar light, that the LEDs 11 are arranged so as to divide planar light into a plurality of sections to permit luminance to be varied section by section. Examples are arrangements of the LEDs 11 as shown in FIGS. 8 to 14.

In the arrangement of the LEDs 11 in FIG. 8 (Example 8), as in the arrangement of the LEDs in Example 1 shown in FIG. 1, rows (X-direction rows) in which LEDs 11 are arranged at the same positions with respect to the Y direction and side by side along the X direction are arranged side by side in the Y direction so that a plurality of LEDs 11 are in a lattice-like (also the arrangements of the LEDs 11 in Examples 9 and 10 shown in FIGS. 9 and 10, respectively, described later, like that of Example 8, are matrix-like lattice arrangements in which the positions of the LEDs 11 with respect to the X direction between adjacent X-direction rows are the same from one X-direction row to the next).

Figure 8:
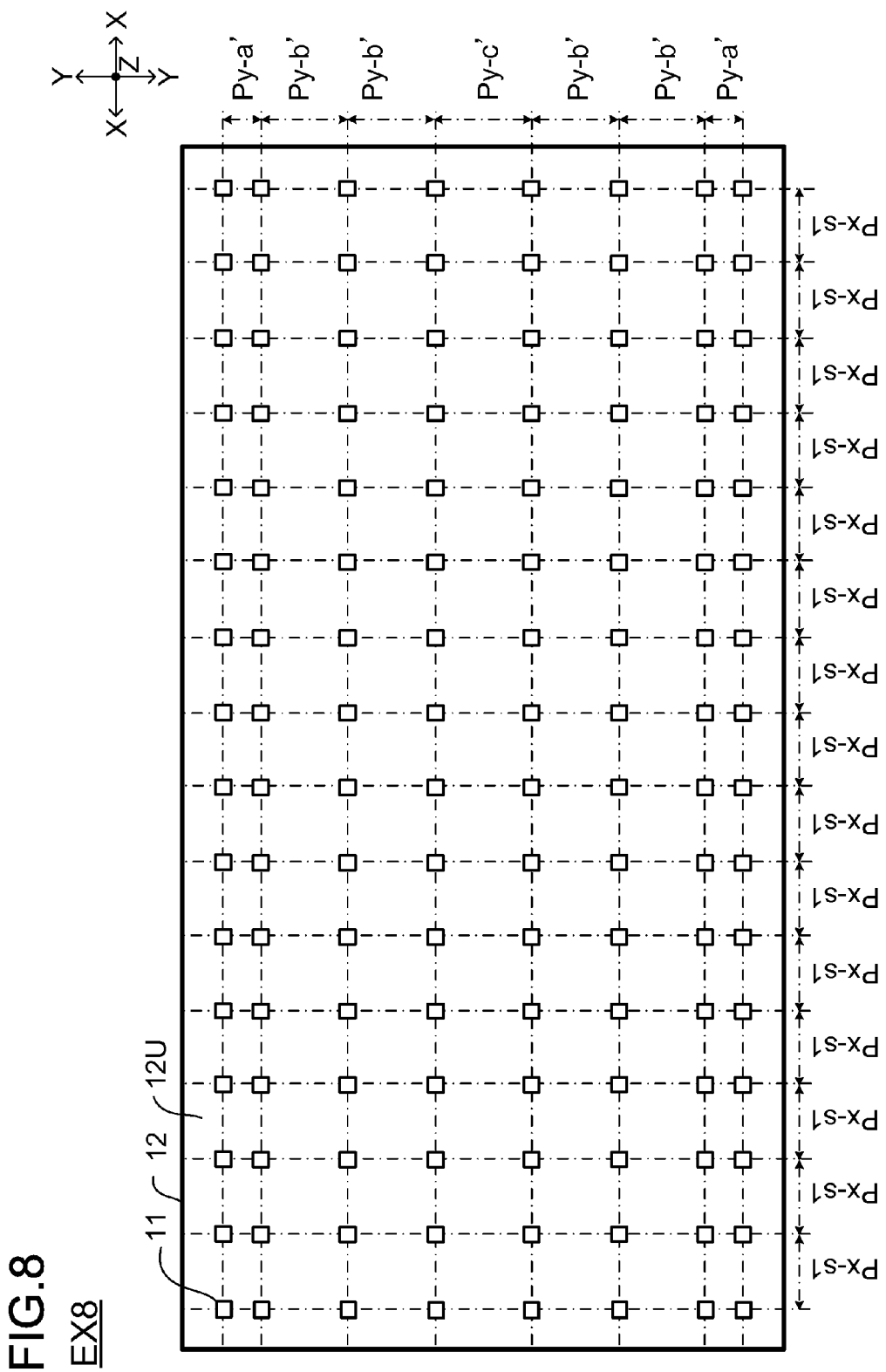
[FIG. 8] is a plan view showing an arrangement of LEDs in Example 8.

Moreover, in the arrangement of the LEDs 11 in FIG. 8, as in the arrangement of the LEDs in FIG. 1, whereas the intervals between the Y-direction rows are equal, namely Px-s1, the intervals between the X-direction rows are not equal (that is, there are a plurality of kinds of intervals among the intervals between the X-direction rows). In the arrangement of the LEDs 11 in FIG. 8, however, unlike in the arrangement of the LEDs in FIG. 1, the interval between the X-direction rows corresponding to near the planar center of the planar light is longer than the interval between the X-direction rows corresponding to elsewhere than near the planar center of the planar light.

For example, as shown in FIG. 8, in a group of LEDs 11 in a lattice arrangement with 16 of them in the X direction and 8 of them in the Y direction, the two X-direction rows located fourth from the two outermost rows in the Y direction produce the light near the planar center of the planar light (whereas the other X-direction rows than those two produce the light elsewhere than near the planar center of the planar light). Thus, the interval Py-c' between those two X-direction rows is longer than the intervals Py-b' and Py-a' between the other adjacent X-direction rows (the intervals having the relationship interval Py-c'>interval Py-b'> interval Py-a').

With the LEDs 11 in such a lattice arrangement, the planar light has higher luminance in a peripheral region elsewhere than near the planar center than in a region near the center. Thus, it is possible to prevent insufficient luminance in a peripheral region of the planar light while retaining the uniformity of the planar light.

That is, with this arrangement of the LEDs 11, the planar light is divided into a section (central section) in a region including the planar center and extending in the X direction and a section (peripheral section) in the region other than that region. Here, the intervals Py-a' and Py-b' between the X-direction rows that produce the light corresponding to the peripheral section is made smaller than the interval Py-c' between the X-direction rows that produce the light corresponding to the central section, and this makes it possible to prevent insufficient luminance in a peripheral region of the planar light while retaining the uniformity of the planar light.

As in Embodiment 1, in a case where the planar light is divided into a central section in a region including the planar center and a peripheral section in the region other than that region, the peripheral section may be further divided into a plurality of subsections. The intervals of the LEDs 11 that produce the light in the divided peripheral subsections may differ from one peripheral subsection to another (for example, in the arrangement of the LEDs 11 in FIG. 8, the interval Py-a' between the X-direction rows corresponding to the peripheral subsection far from the central section is shorter than the interval Py-b' between the X-direction rows corresponding to the peripheral subsection near the central section).

This arrangement of the LEDs 11 makes flexible the luminance distribution of the planar light within the plane, and thus helps more reliably prevent humans from perceiving insufficient luminance in a peripheral region of the planar light.

Figure 9:
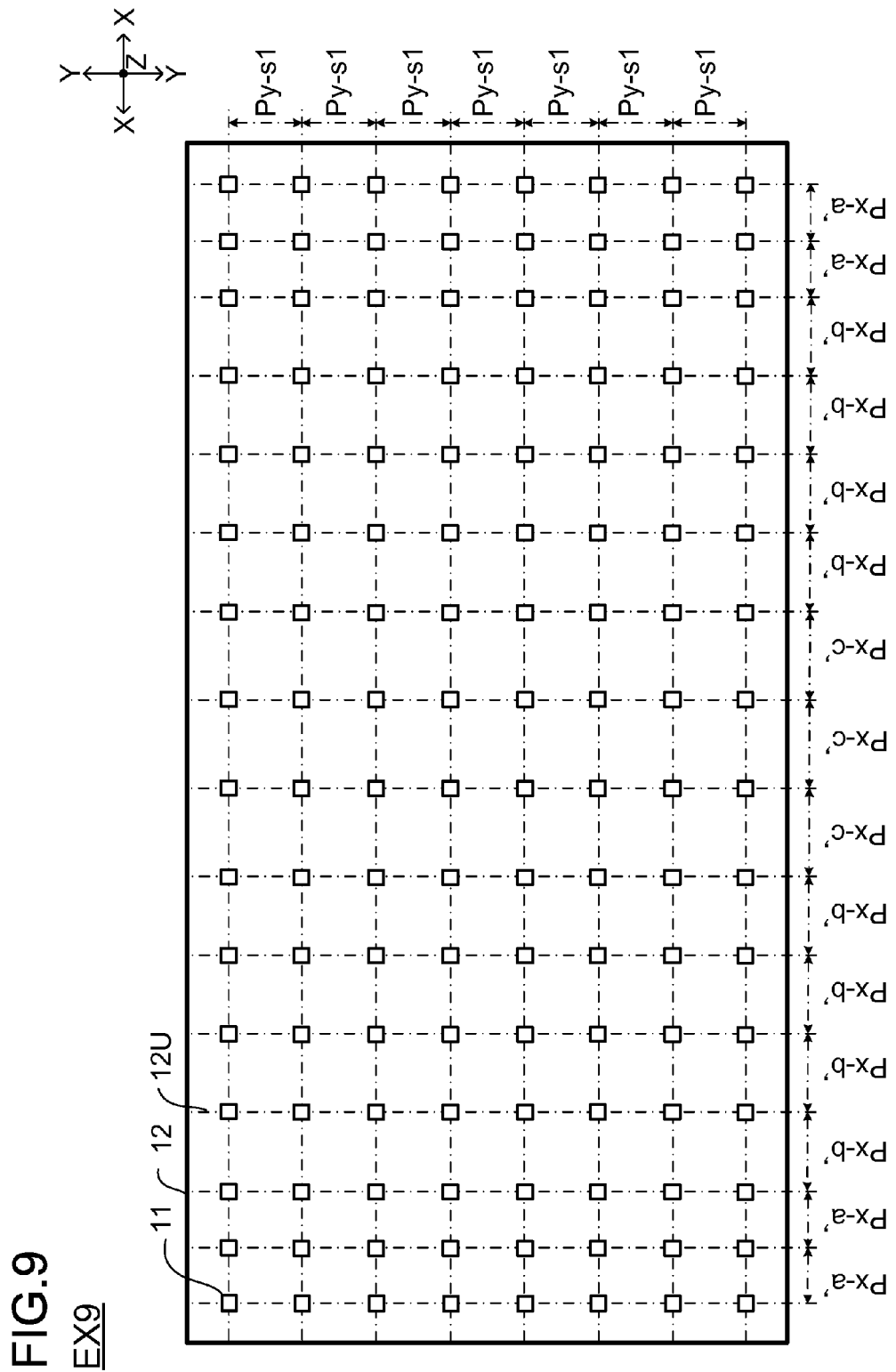
[FIG. 9] is a plan view showing an arrangement of LEDs in Example 9.

The LEDs 11 may be arranged as shown in FIG. 9 (Example 9). In the arrangement of the LEDs 11 in FIG. 9, as in the arrangement of the LEDs in Example 2 shown in FIG. 2, whereas the intervals between the X-direction rows are equal, namely Py-s1, the intervals between the Y-direction rows are not equal (that is, there are a plurality of kinds of intervals among the intervals between the Y-direction rows). In the arrangement of the LEDs 11 in FIG. 9, however, unlike in the arrangement of the LEDs in FIG. 2, the interval between the Y-direction rows corresponding to near the planar center of the planar light is longer than the interval between the Y-direction rows corresponding to other than near the planar center of the planar light.

For example, as shown in FIG. 9, in a group of LEDs 11 in a lattice arrangement with 16 of them in the X direction and 8 of them in the Y direction, the four Y-direction rows located seventh and eights from the two outermost rows in the X direction produce the light near the planar center of the planar light (whereas the other Y-direction rows than those four produce the light elsewhere than near the planar center of the planar light). Thus, the interval Px-c' between those four Y-direction rows is longer than the intervals Px-b' and Px-a' between the other adjacent Y-direction rows (the intervals having the relationship interval Px-c'>interval Px-b'>interval Px-a').

That is, with this arrangement of the LEDs 11, the planar light is divided into a section (central section) in a region including the planar center and extending in the Y direction and a section (peripheral section) in the region other than that region. Here, the intervals Px-a' and Px-b' between the Y-direction rows that produce the light corresponding to the peripheral section is made smaller than the interval Px-c' between the X-direction rows that produce the light corresponding to the central section, and this makes it possible to prevent insufficient luminance in a peripheral region of the planar light while retaining the uniformity of the planar light.

Figure 10:
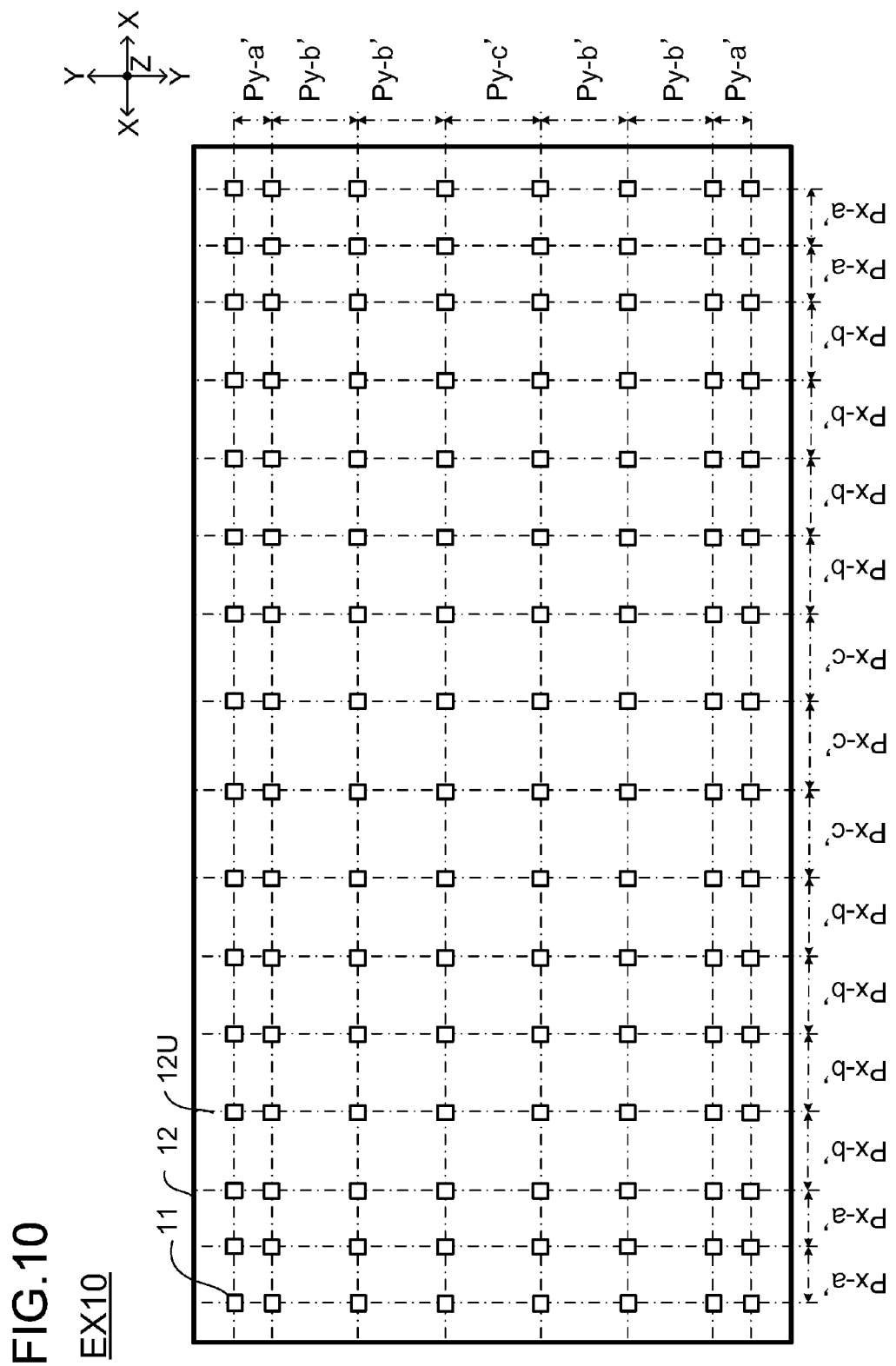
[FIG. 10] is a plan view showing an arrangement of LEDs in Example 10.

The LEDs 11 may be arranged as shown in FIG. 10 (Example 10). More specifically, in the arrangement of the LEDs 11 in FIG. 10, as in the arrangement of the LEDs in FIG. 3, the intervals between the X-direction rows are not equal, nor are the intervals between the Y-direction rows (that is, there are a plurality of kinds of intervals among the intervals between the X-direction rows, and in addition there are a plurality of kinds of intervals among the intervals between the Y-direction rows).

Here, however, the interval between the X-direction rows corresponding to near the center of the planar light is longer than the interval between the X-direction rows corresponding to elsewhere than near the center of the planar light, and in addition the intervals between the Y-direction rows corresponding to near the center of the planar light is longer than the intervals between the Y-direction rows corresponding to elsewhere than near the center of the planar light.

Thus, the arrangement of the LEDs 11 in FIG. 10 is, so to speak, a mixture of the arrangements of the LEDs 11 in FIGS. 8 and 9. Accordingly, in a group of LEDs 11 in a lattice arrangement with 16 of them in the X direction and 8 of them in the Y direction, the two X-direction rows located fourth from the two outermost rows in the Y direction and the four Y-direction rows located seventh and eighth from the two outermost rows in the X direction produce the light near the planar center of the planar light (whereas the LEDs 11 in the rows other than those just mentioned produce the light elsewhere than near the planar center of the planar light).

Here, the interval Py-c' between the two X-direction rows located fourth from the two outermost rows in the Y direction is longer than the intervals Py-b' and Py-a' between the other adjacent X-direction rows. In addition, the interval Px-c' between the four Y-direction rows located seventh and eighths from the two outermost rows in the X direction is longer than the intervals Px-b' and Px-a' between the other adjacent Y-direction rows.

That is, in a case where LEDs 11 are arranged in intersecting X and Y directions, there may be a plurality of kinds of intervals among the intervals between the LEDs 11 arranged in the two, X and Y, directions (i.e., there need to be a plurality of kinds of intervals among the intervals between the LEDs 11 arranged in at least one of the X and Y directions). Also this arrangement of the LEDs 11, like those of Examples 8 and 9, makes it possible to prevent insufficient luminance in a peripheral region of the planar light while retaining the uniformity of the planar light.

Figure 11:
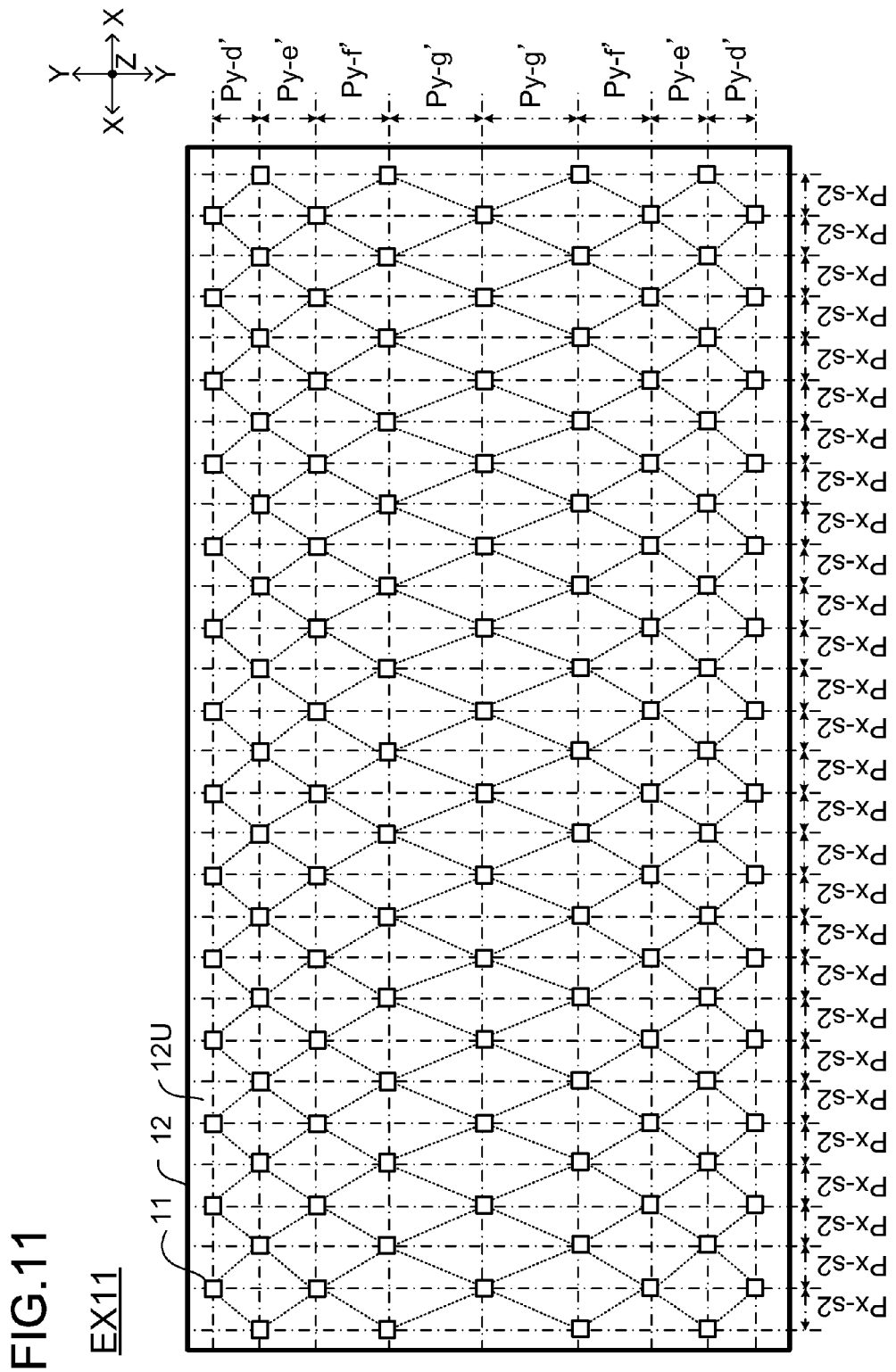
[FIG. 11] is a plan view showing an arrangement of LEDs in Example 11.

The LEDs 11 may be arranged as shown in FIG. 11 (Example 11). In the arrangement of the LEDs 11 in FIG. 11, as in the arrangement of the LEDs in Example 4 shown in FIG. 4, the positions of the LEDs 11 with respect to the X direction in adjacent X-direction rows differ from one X-direction row to the next. In other words, the positions of the LEDs 11 with respect the Y direction in adjacent Y-direction rows differ from one Y-direction row to the next (also in Examples 12 and 13 shown in FIGS. 12 and 13 described later, as in Example 11, the LEDs 11 are arranged in a staggered lattice arrangement).

More specifically, whereas the intervals between the Y-direction rows are equal, namely Px-s2, the intervals between the X-direction rows are not equal. In the arrangement of the LEDs 11 in FIG. 11, however, unlike in the arrangement of LEDs in FIG. 4, the intervals between the X-direction rows corresponding to near the planar center of the planar light is longer than the intervals between the X-direction rows corresponding to elsewhere than near the planar center of the planar light.

For example, as shown in FIG. 11, starting at one outermost row in the Y direction, X-direction rows with 14 LEDs 11 and X-direction rows with 15 LEDs 11 are arranged alternately side by side in the Y direction to form a lattice arrangement composed of a total of nine X-direction rows. In this group of LEDs 11 in a lattice arrangement, the three X-direction rows located fourth, fifth, and sixth from one outermost row in the Y direction produce the light near the planar center of the planar light (whereas the X-direction rows other than those three produce the light elsewhere than near the planar center of the planar light). Thus, the interval Py-g' between those three X-direction rows is longer than the intervals Py-f', Py-e', and Py-d' between the other adjacent X-direction rows (the intervals having the relationship interval Py-d'<interval Py-e'<interval Py-f'<interval Py-g').

That is, with this arrangement of the LEDs 11, the planar light is divided into a section (central section) in a region including the planar center and extending in the X direction and a section (peripheral section) in the region other than that region. The intervals Py-d', Py-e', and Py-f' between the X-direction rows that produce the light corresponding to the peripheral section is made shorter than the interval Py-g' between the X-direction rows that produce the light corresponding to the central section, and this makes it possible to prevent insufficient luminance in a peripheral region of the planar light while retaining the uniformity of the planar light.

Figure 12:
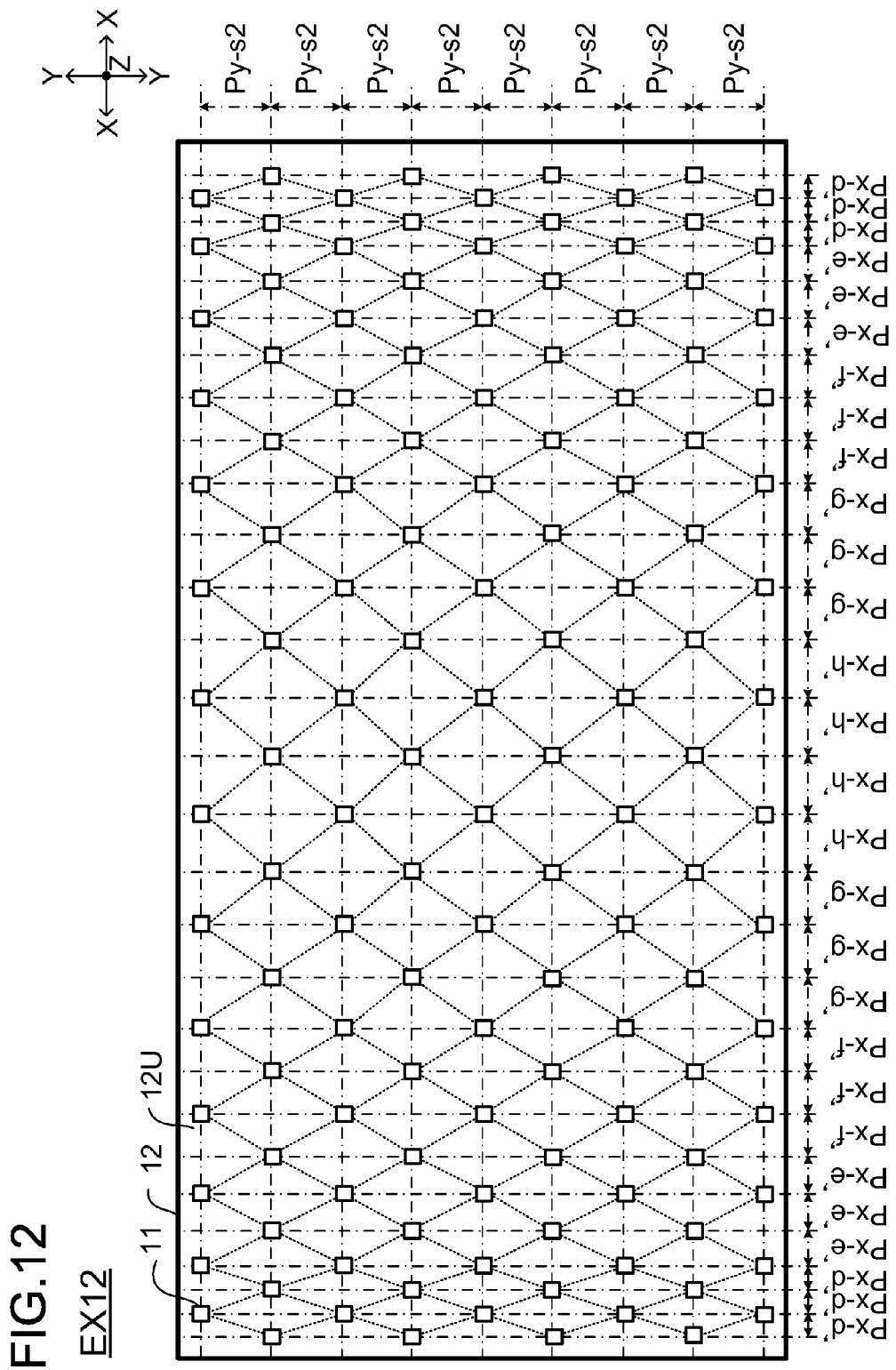
[FIG. 12] is a plan view showing an arrangement of LEDs in Example 12.

The LEDs 11 may be arranged as shown in FIG. 12 (Example 12), In the arrangement of the LEDs 11 in FIG. 12, as in the arrangement of the LEDs in Example 5 shown in FIG. 5, whereas the intervals between the X-direction rows are equal, namely Py-s2, the intervals between the Y-direction rows are not equal. In the arrangement of the LEDs 11 in FIG. 12, however, unlike in the arrangement of the LEDs in FIG. 5, the intervals between the Y-direction rows corresponding to near the planar center of the planar light is longer than the intervals between the Y-direction rows corresponding to elsewhere than near the planar center of the planar light.

For example, as shown in FIG. 12, starting at one outermost row in the X direction, Y-direction rows with four LEDs 11 and Y-direction rows with five LEDs 11 are arranged alternately side by side in the X direction to form a lattice arrangement composed of a total of 29 Y-direction rows. In this group of LEDs 11 in a lattice arrangement, the five Y-direction rows located 13th to 17th from one outermost row in the X direction produce the light near the planar center of the planar light (whereas the Y-direction rows other than those five produce the light elsewhere than near the planar center of the planar light). Thus, the interval Px-h' between those five Y-direction rows is longer than the intervals Px-d', Px-e', Px-f', and Px-g' between the other adjacent Y-direction rows (the intervals having the relationship interval Px-d'<interval Px-e'<interval Px-f'<interval Px-g'<interval Px-h').

That is, with this arrangement of the LEDs 11, the planar light is divided into a section (central section) in a region including the planar center and extending in the Y direction and a section (peripheral section) in the region other than that region. The intervals Px-d', Px-e', Px-f', and Px-g' between the Y-direction rows that produce the light corresponding to the peripheral section are made shorter than the interval Px-h' between the Y-direction rows that produce the light corresponding to the central section. This makes it possible to prevent insufficient luminance in a peripheral region of the planar light while retaining the uniformity of the planar light.

Figure 13:
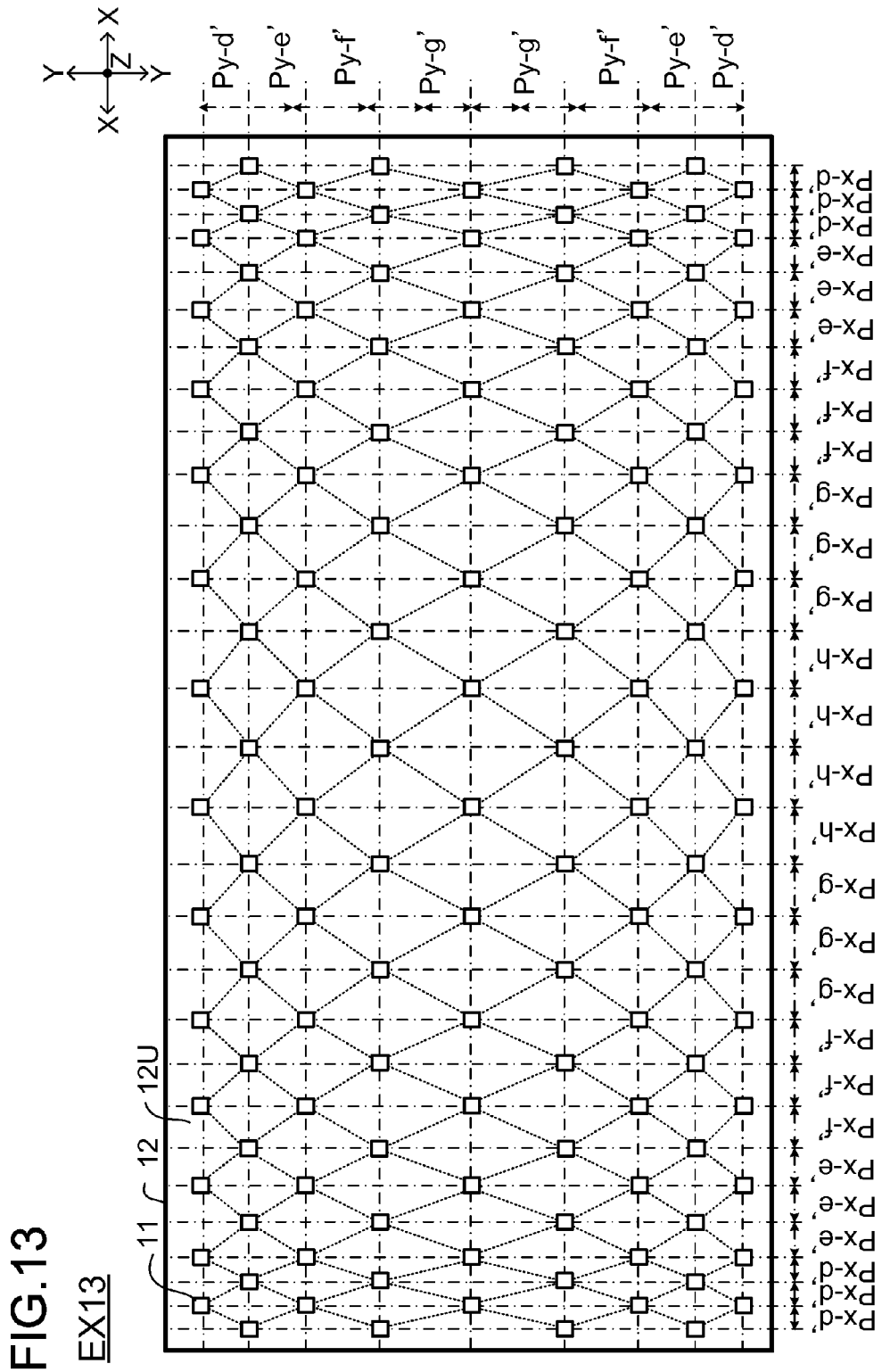
[FIG. 13] is a plan view showing an arrangement of LEDs in Example 13.

The LEDs 11 may be arranged as shown in FIG. 13 (Example 13). More specifically, the arrangement of the LEDs 11 in FIG. 13 is, like the arrangement of the LEDs 11 in Example 6 shown in FIG. 6, a lattice arrangement in which the positions of the LEDs 11 with respect to the X direction in adjacent X-direction rows differ from one X-direction row to the next, and in addition the positions of the LEDs 11 with respect to the Y direction in adjacent Y-direction rows differ from one Y-direction row to the next.

Here, however, the interval between the X-direction rows corresponding to near the center of the planar light is longer than the interval between the X-direction rows corresponding to elsewhere than near the center of the planar light, and in addition the intervals between the Y-direction rows corresponding to near the center of the planar light is longer than the intervals between the Y-direction rows corresponding to elsewhere than near the center of the planar light.

Thus, the arrangement of the LEDs 11 in FIG. 13 is, so to speak, a mixture of the arrangements of the LEDs 11 in FIGS. 11 and 12. More specifically, X-direction rows with 14 LEDs 11 and X-direction rows with 15 LEDs 11 are arranged alternately side by side in the Y direction to form a lattice arrangement composed of a total of nine X-direction rows (in other words, Y-direction rows with four LEDs 11 and Y-direction rows with five LEDs 11 are arranged alternately side by side in the X direction to form a lattice arrangement composed of a total of 29 Y-direction rows).

In this group of LEDs 11 in a lattice arrangement, the three X-direction rows located fourth, fifth, and sixth from one outermost row in the Y direction and the five Y-direction rows located 13th to 17th from one outermost row in the X direction produce the light near the planar center of the planar light (whereas the LEDs 11 in the rows other than those just mentioned produce the light elsewhere than near the planar center of the planar light).

Thus, the interval Py-g' between the three X-direction rows located at fourth, fifth, and sixth from one outermost row in the Y direction is longer than the intervals Py-d', Py-e', and Py-f' between the other adjacent X-direction rows. In addition, the interval Px-h' between five Y-direction rows located at 13th to 17th from one outermost row in the X direction are longer than the intervals Px-d', Px-e', Px-f', and Px-g' between the other adjacent Y-direction rows.

That is, in a case where LEDs 11 are arranged in intersecting X and Y directions, there may be a plurality of kinds of intervals among the intervals between the LEDs 11 arranged in the two, X and Y, directions. Also this arrangement of the LEDs 11, like those of Examples 11 and 12, makes it possible to prevent insufficient luminance in a peripheral region of the planar light while retaining the uniformity of the planar light.

Figure 14:
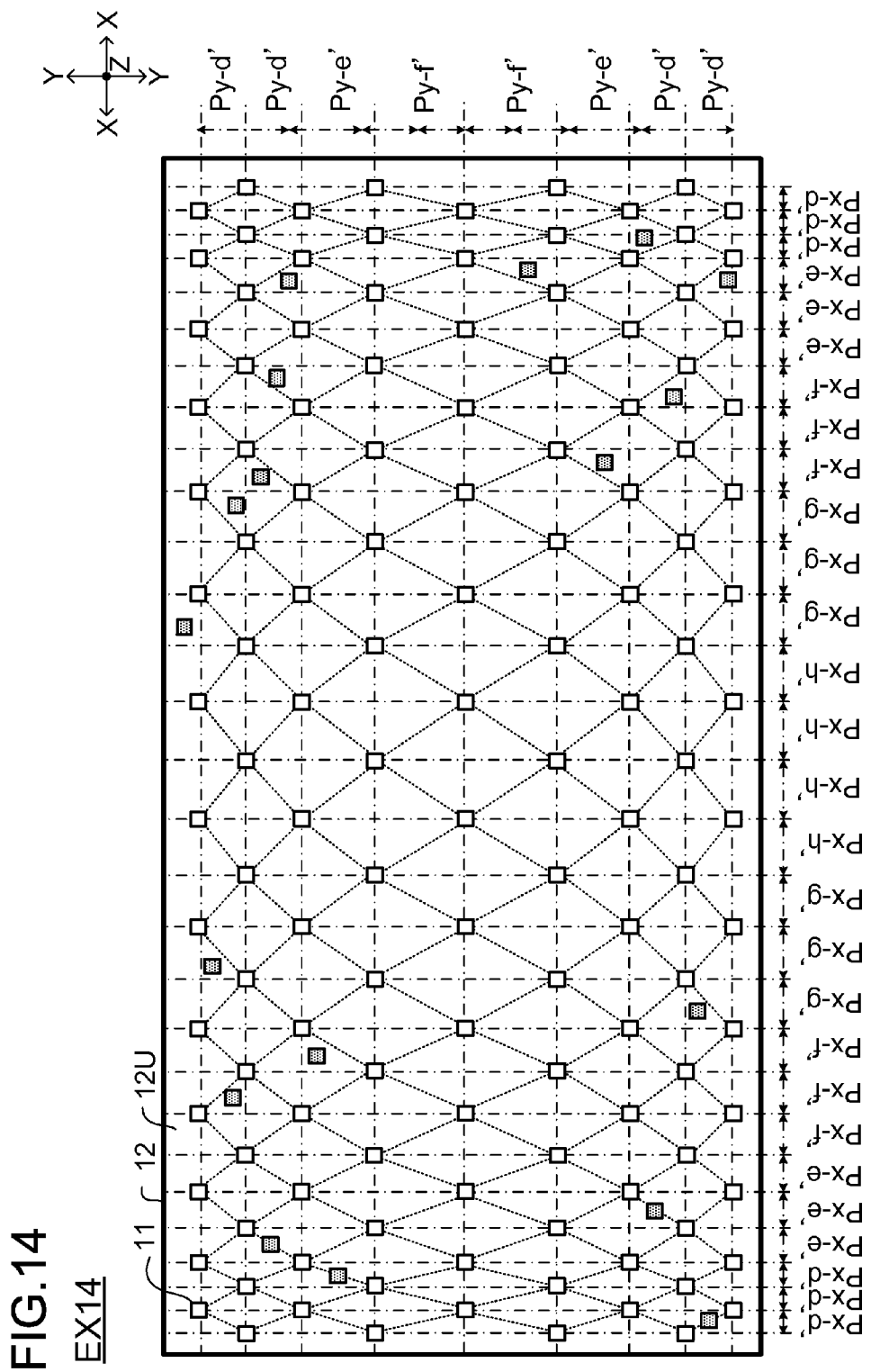
[FIG. 14] is a plan view showing an arrangement of LEDs in Example 14.

As shown in FIG. 14 (Example 14), a group of LEDs 11 in a staggered arrangement may further include one or more LEDs (hatched by dots) that are not included in any X- or Y-direction row. Even a group of LEDs 11 in a matrix-like arrangement as shown in FIGS. 8 to 10 may include one or more LEDs that are not included in any X- or Y-direction row. Providing such irregularly arranged LEDs 11 increases flexibility in the adjustment of the luminance of the planar light (i.e., makes finer luminance adjustment possible).

Specific values for the intervals at which the LEDs 11 are arranged in Embodiment 2 can be set as desired. To prevent an excessive lowering of luminance near the center of the planar light, it is preferable to set those value, for example, close to the intervals at which the LEDs 11 that produce the light near the center of the planar light are arranged in Embodiment 1 (the LEDs 11 need to be arranged, however, with consideration given to the cost balance of the backlight unit 49, the balance of power consumption, and the balance of the uniformity of the planar light).

[Embodiment 3]

A third embodiment of the invention will now be described. Such members as have similar functions to those used in Examples 1 and 2 are identified by the same reference signs, and no overlapping descriptions will be repeated.

In Examples 1 to 6 and Examples 8 to 13 according to Embodiments 1 and 2, on the mounting surface 12U of the mounting board 12, the X- and Y-direction rows, which extend over its entire area in the X and Y directions respectively, include all the LEDs 11. This, however, is not meant as any limitation. Specifically, the LEDs 11 may be arranged on any principle other than the regularity of X- and Y-direction rows. For example, the LEDs 11 may be arranged as shown in FIG. 15 (Example 15).

Figure 15:
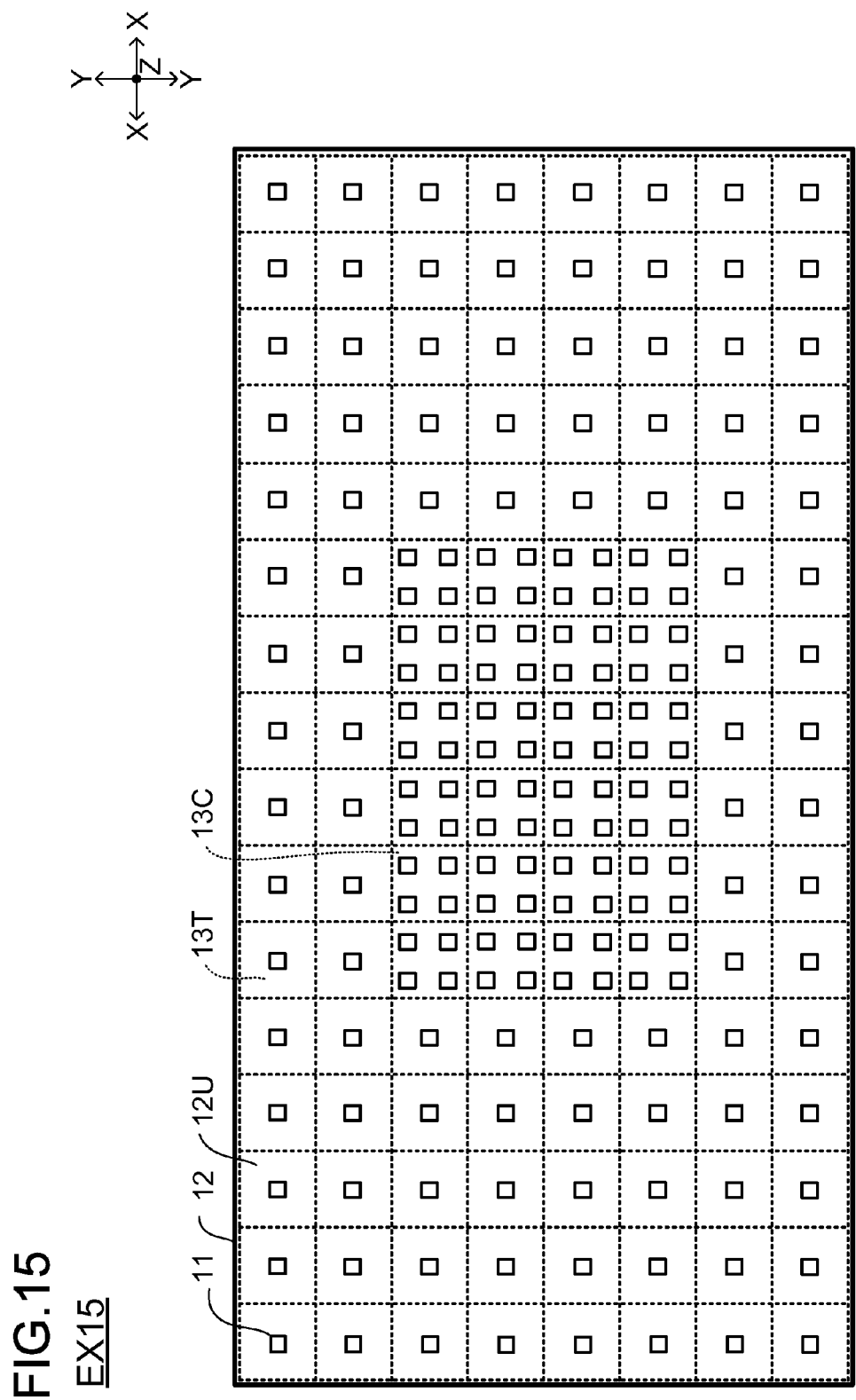
[FIG. 15] is a plan view showing an arrangement of LEDs in Example 15.

As shown in FIG. 15, a plurality of LEDs 11 are in a planar arrangement, and the arrangement surface of this planar arrangement includes a plurality of divided regions 13 divided like a lattice (see the regions divided by dotted lines). The LEDs 11 are so arranged as to be located within those divided regions 13. There are a plurality of kinds of numbers among the numbers of LEDs 11 located within the divided regions 13. This permits the LEDs 11 to be arranged with a difference in density.

Specifically, in a case where, as in Embodiment 1, the purpose is to permit humans to perceive entire planar light to have uniform luminosity, as shown in FIG. 15, preferably, the number of LEDs 11 included in divided regions 13 near the center of the mounting surface 12U is made greater than the number of LEDs 11 included in divided regions 13 near the periphery of the mounting surface 12U. More specifically, when the divided regions 13 in which the LEDs 11 that produce the light near the planar center of the planar light are located are referred to as the central divided regions 13C, and the divided regions 13 in which the LEDs 11 that produce the peripheral light elsewhere than near the planar center of the planar light are located are referred to as the peripheral divided regions 13T, then, preferably, the number of LEDs 11 included in the central divided regions 13C is greater than the number of LEDs 11 included in the peripheral divided regions 13T.

Figure 16:
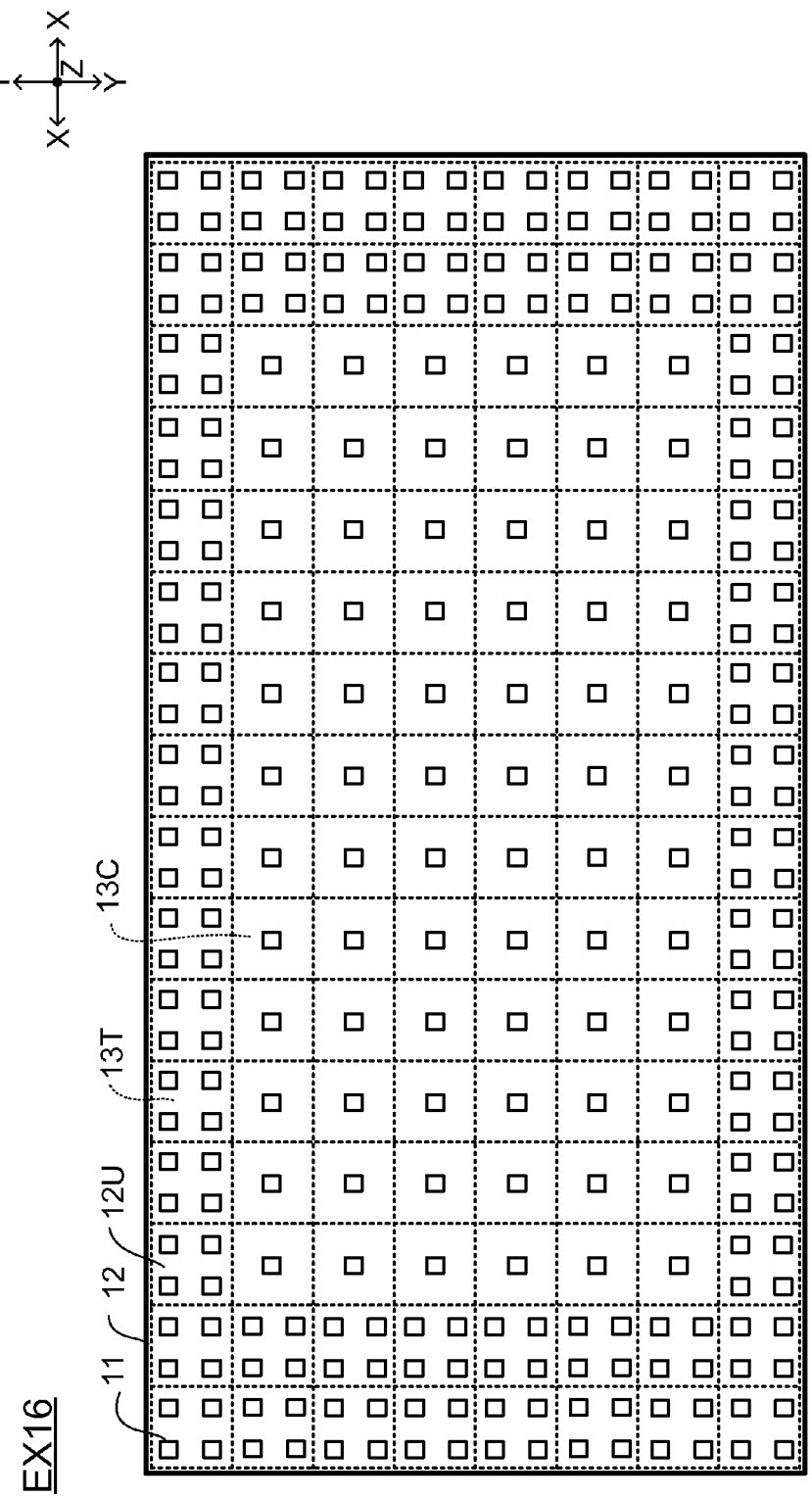
[FIG. 16] is a plan view showing an arrangement of LEDs in Example 16.

On the other hand, in a case where, as in Embodiment 2, the purpose is to prevent insufficient luminance in a peripheral region of the planar light while retaining the uniformity of the planar light, as shown in FIG. 16 (Example 16), preferably, the number of LEDs 11 included in divided regions 13 near the periphery of the mounting surface 12U is made greater than the number of LEDs 11 included in divided regions 13 near the center of the mounting surface 12U. More specifically, preferably, the number of LEDs 11 included in the peripheral divided regions 13T is greater than the number of LEDs 11 included in the central divided regions 13C.

[Embodiment 4]

A fourth embodiment of the invention will now be described. Such members as have similar functions to those used in Examples 1 to 3 are identified by the same reference signs, and no overlapping descriptions will be repeated.

In Embodiments 1 to 3, all the LEDs 11 in a lattice arrangement emit light in the same direction, and the light gathers to produce planar light (see FIG. 18). This, however, is not meant to limit how planar light is produced. For example, as shown in FIG. 20, it is also possible to arrange LEDs 11 in one row along the X direction (a single LED module MJx) and in one row along the Y direction (a single LED module MJy) and make them emit light in different (for example, intersecting) directions so that the light overlaps to form planar light.

Figure 20:
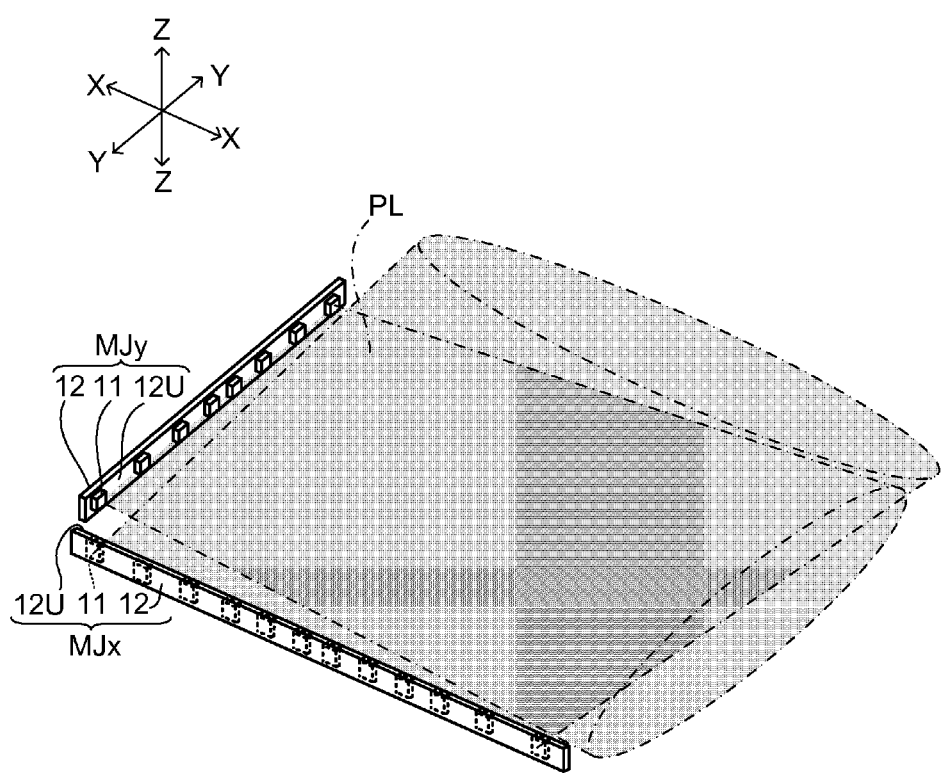
[FIG. 20] is a perspective view showing how planar light is produced.
Figure 21:
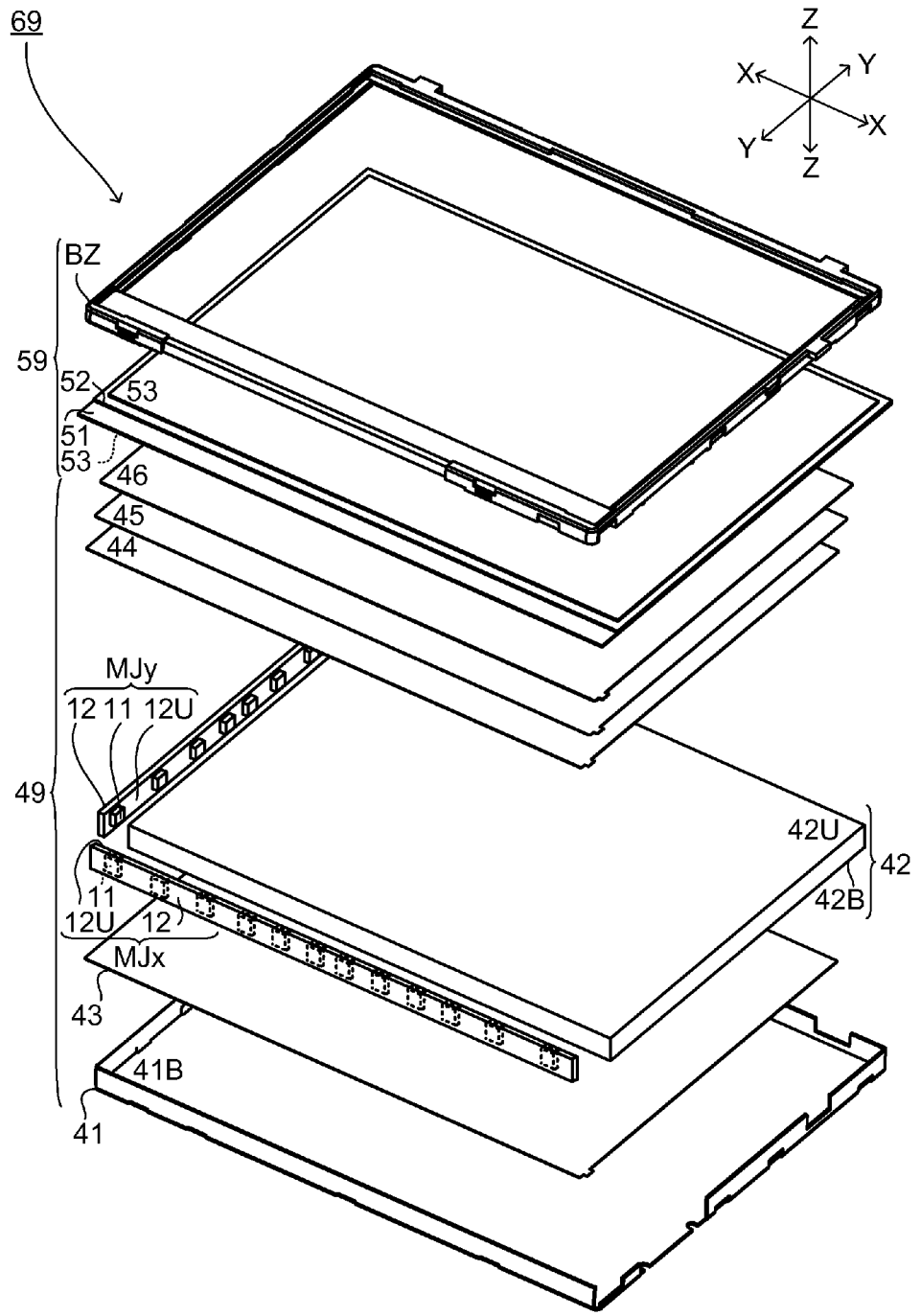
[FIG. 21] is an exploded perspective view of a liquid crystal display apparatus.

The planar light shown in FIG. 20, however, does not tend to travel toward the optical sheers 44 to 46 and hence toward liquid crystal display panel 59. As a remedy, preferably, as shown in FIG. 21, an LED module MJx in which LEDs 11 arranged side by side along the X direction are mounted on a mounting board 12 and an LED module MJy in which LEDs 11 arranged side by side along the Y direction are mounted on a mounting board 12 are arranged at intersecting side edges of a light guide plate 42 (i.e., preferably, one row of LEDs 11 arranged along the X direction and one row of LEDs 11 arranged along the Y direction intersect such that LEDs 11 are arranged two-dimensionally).

With this design, the light from the two LED modules MJ (MJx and MJy) is reflected repeatedly inside the light guide plate 42 and planar light emerges through the top face 42U of the light guide plate 42. Thus, in the structure shown in FIG. 21 where the optical sheets 44 to 46 and the liquid crystal display panel 59 are stacked on top of the top face 42U of the light guide plate 42, these are supplied with planar light (the light that leaks through the bottom face 42B of the light guide plate 42 is reflected on a reflective sheet 43 to travel back into the light guide plate 42).

Figure 22:
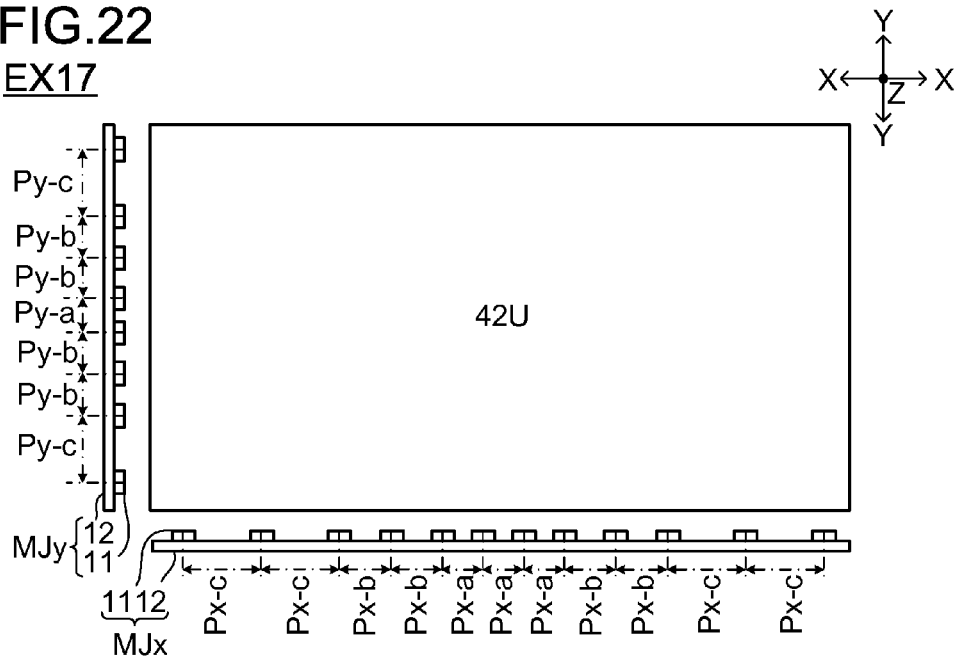
[FIG. 22] is a plan view showing an arrangement of LEDs in Example 17.

In a case where, as in Embodiment 1, the purpose is to permit humans to perceive entire planar light to have uniform luminance, preferably, for example as shown in FIG. 22 (Example 17), among the LEDs 11 arranged in a row in the LED module MJx, the interval between the LEDs 11 near the center is made shorter than the interval between the LEDs 11 near the periphery, and among the LEDs 11 arranged in a row in the LED module MJy, the interval between the LEDs 11 near the center is made shorter than the interval between the LEDs 11 near the periphery.

This, however, is not meant to be any limitation. The backlight unit 49 may incorporate an LED module MJx having LEDs 11 arranged with a difference in density as shown in FIG. 22 in combination with an LED module MJy having LEDs 11 arranged with uniform density (i.e., an LED module MJy having LEDs 11 arranged at equal intervals). Reversely, the backlight unit 49 may incorporate an LED module MJy having LEDs 11 arranged with a difference in density as shown in FIG. 22 in combination with an LED module MJx having LEDs 11 arranged with uniform density.

Figure 23:
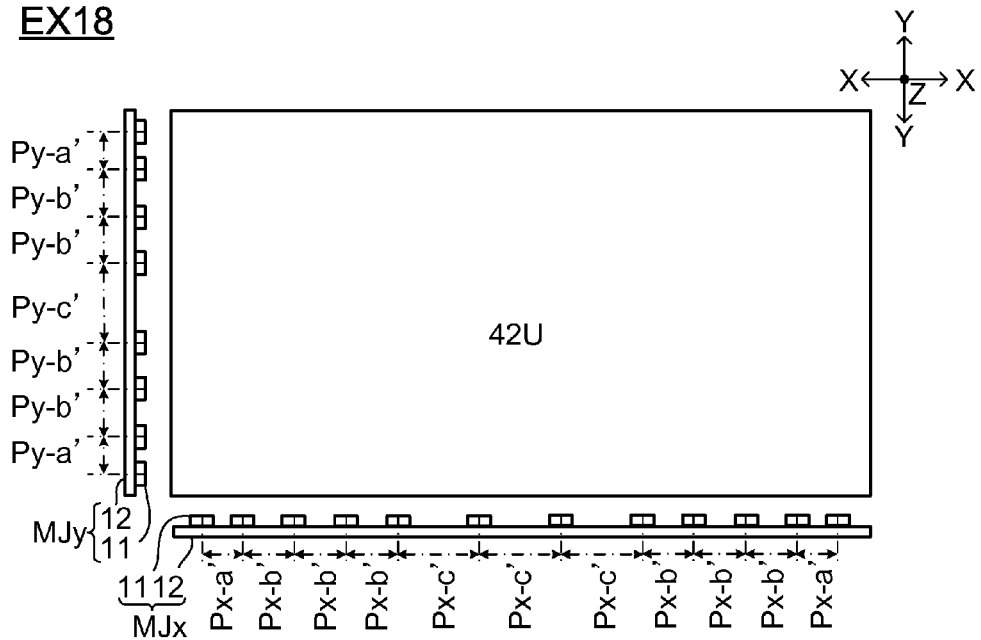
[FIG. 23] is a plan view showing an arrangement of LEDs in Example 18.

On the other hand, in a case where the purpose is to prevent insufficient luminance in a peripheral region of planar light while retaining the uniformity of the planar light, preferably, for example as shown in FIG. 23 (Example 18), among the LEDs 11 arranged in a row in the LED module MJx, the interval between the LEDs 11 near the center is made longer than the interval between the LEDs 11 near the periphery, and among the LEDs 11 arranged in a row in the LED module MJy, the interval between the LEDs 11 near the center is made longer than the interval between the LEDs 11 near the periphery.

This, however, is not meant to be any limitation. The backlight unit 49 may incorporate an LED module MJx having LEDs 11 arranged with a difference in density as shown in FIG. 23 in combination with an LED module MJy having LEDs 11 arranged with uniform density (i.e., an LED module MJy having LEDs 11 arranged at equal intervals). Reversely, the backlight unit 49 may incorporate an LED module MJy having LEDs 11 arranged with a difference in density as shown in FIG. 23 in combination with an LED module MJx having LEDs 11 arranged with uniform density.

Although the LED modules MJ are arranged in an L shape in FIGS. 22 and 23, this is not meant as any limitation. For example, as shown in FIG. 24 (Example 19), two LED modules MJx may be arranged opposite each other across the light guide plate 42 (i.e., LED modules MJx may be arranged one at each of opposite side edges of the light guide plate 42).

Also with this arrangement of the LEDs 11, light is emitted in different directions and the light overlaps to form planar light. In addition, as a result of the light from the two opposite LED modules MJx entering the light guide plate 42, planar light is supplied to the optical sheets 44 to 46 and to the liquid crystal display panel 59.

In Example 19, with a view to permitting humans to perceive the entire planar light to have uniform luminance, among the LEDs 11 in a row in each of the two LED modules MJx, the interval between the LEDs 11 near the center is made shorter than the interval between the LEDs 11 near the periphery. This arrangement, however, is not meant as any limitation. For example, of the two LED modules MJx, one alone may be an LED module MJx having LEDs arranged with a difference in density.

With a view to preventing insufficient luminance in a peripheral region of the planar light while retaining the uniformity of the planar light, two LED modules MJx in which the interval between the LEDs 11 near the center is longer than the interval between the LEDs 11 near the periphery may be arranged opposite each other (needless to say, of the two LED modules MJx, one alone may be an LED module MJx having LEDs arranged with a difference in density).

Although, in Example 19, LED modules MJx along the X direction are arranged opposite each other, this is not meant to be any limitation; instead, two LED modules MJy along the Y direction may be arranged opposite each other across the light guide plate 42 (i.e., LED modules MJy may be arranged one at each of opposite side edges of the light guide plate 42). Needless to say, among the LEDs 11 in a row in each of the two LED modules MJy, the interval between the LEDs 11 near the center may be shorter, or longer, than the interval between the LEDs 11 near the periphery.

As shown in FIG. 25 (Example 20), four LED modules MJ (that is, two LED modules MJx and two LED modules MJy) may be arranged in a loop around the light guide plate 42. That is, LED modules MJ may be arranged one at each of all—two pairs of mutually opposite—side edges of the light guide plate 42.

The LEDs 11 in the LED modules MJ may be arranged at any intervals. For example, with a view to permitting humans to perceive the entire planar light to have uniform luminance, LED modules MJx and MJy may be arranged in which the intervals between LEDs 11 near the center is shorter than the interval between LEDs 11 near the periphery. For another example, with a view to preventing insufficient luminance in a peripheral region of the planar light, LED modules MJx and MJy may be arranged in which the intervals between LEDs 11 near the center is longer than the interval between LEDs 11 near the periphery.

Figure 26:
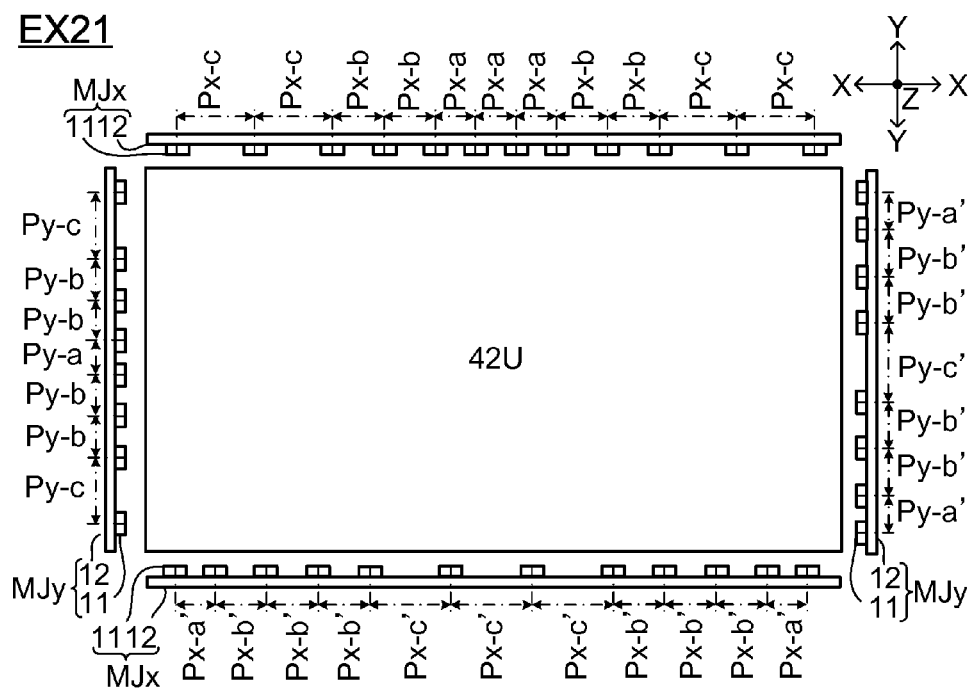
[FIG. 26] is a plan view showing an arrangement of LEDs in Example 21.

As shown in FIG. 26 (Example 21), with a view to reliably enhancing the uniformity of the planar light, LEDs 11 may be arranged with different kinds of density between opposite LED modules MJ.

Specifically, of the LED modules MJx located opposite each other, in one LED module MJx, the interval between LEDs 11 near the center is shorter than the interval between LEDs 11 near the periphery; in the other LED module MJx, the interval between LEDs 11 near the center is longer than the interval between LEDs 11 near the periphery. Likewise, of the LED modules MJy located opposite each other, in one LED module MJy, the interval between LEDs 11 near the center is shorter than the interval between LEDs 11 near the periphery; in the other LED module MJy, the interval between LEDs 11 near the center is longer than the interval between LEDs 11 near the periphery.

Also in a backlight unit 49 (see FIG. 24) in which two LED module MJx are arranged opposite each other, in one LED module MJx, the interval between LEDs 11 near the center may be shorter than the interval between LEDs 11 near the periphery; in the other LED module MJx, the interval between LEDs 11 near the center may be longer than the interval between LEDs 11 near the periphery.

Also in a backlight unit 49 in which two LED module MJy are arranged opposite each other, in one LED module MJy, the interval between LEDs 11 near the center may be shorter than the interval between LEDs 11 near the periphery; in the other LED module MJy, the interval between LEDs 11 near the center may be longer than the interval between LEDs 11 near the periphery.

Also in a backlight unit 49 (see FIGS. 22 and 23) in which LED modules MJx and MJy are in an intersecting arrangement, in one LED module MJ (MJx or MJy), the interval between LEDs 11 near the center may be shorter than the interval between LEDs 11 near the periphery; in the other LED module MJ (MJy or MJx), the interval between LEDs 11 near the center may be longer than the interval between LEDs 11 near the periphery.

That is, irrespective of whether LED modules MJ are arranged in an intersecting, opposite, or loop-forming arrangement, arranging LEDs 11 at irregular pitches in at least one LED module MJ produces an effect commensurate with the arrangement.

There is no particular restriction on the number of LEDs 11 included in each LED module MJ. For example, in a case where, as shown in FIG. 24, LED modules MJx are arranged opposite each other, the number of LEDs 11 in the LED module MJx in which the interval between LEDs 11 near the center is shorter than the interval between LEDs 11 near the periphery may be greater than the number of LEDs 11 in the LED module MJx in which the interval between LEDs 11 near the center is longer than the interval between LEDs 11 near the periphery. This is because the number of LEDs 11 may be varied as necessary with consideration given to the cost balance of the backlight unit 49, the balance of electric power consumption, and the balance of the uniformity of the planar light.

[Embodiment 5]

A fifth embodiment of the invention will now be described. Such members as have similar functions to those used in Examples 1 to 4 are identified by the same reference signs, and no overlapping descriptions will be repeated.

In cases where, as in Embodiments 1 to 3, all LEDs 11 in a lattice arrangement emit light in the same direction and the light from them gathers to form planar light, there is provided a single mounting board 12. This, however, is not meant as any limitation. For example, as shown in FIG. 27 (Example 22), the backlight unit 49 may incorporate smaller mounting substrates 12s, as if obtained by dividing the mounting board 12 in Example 2 (see FIG. 2) into two parts, with LEDs 11 in the same lattice arrangement on each of the mounting boards 12s.

With this design, the mounting boards 12s have a comparatively small size, and this facilitates the handling of the mounting boards 12s in the manufacturing process of the backlight unit 49. Moreover, the mounting board 12s are of the same type, having the same electrode arrangement (and hence the same arrangement of LEDs 11), are accordingly easy to mass-produce, and thus help reduce the cost of the mounting board 12s. Thus, a backlight unit 49 incorporating such mounting boards 12s can be manufactured easily and at reduced cost. Moreover, the size of the backlight unit 49 (and hence the size of the liquid crystal display panel 59) does not limit the application of the mounting boards 12s.

Figure 27:
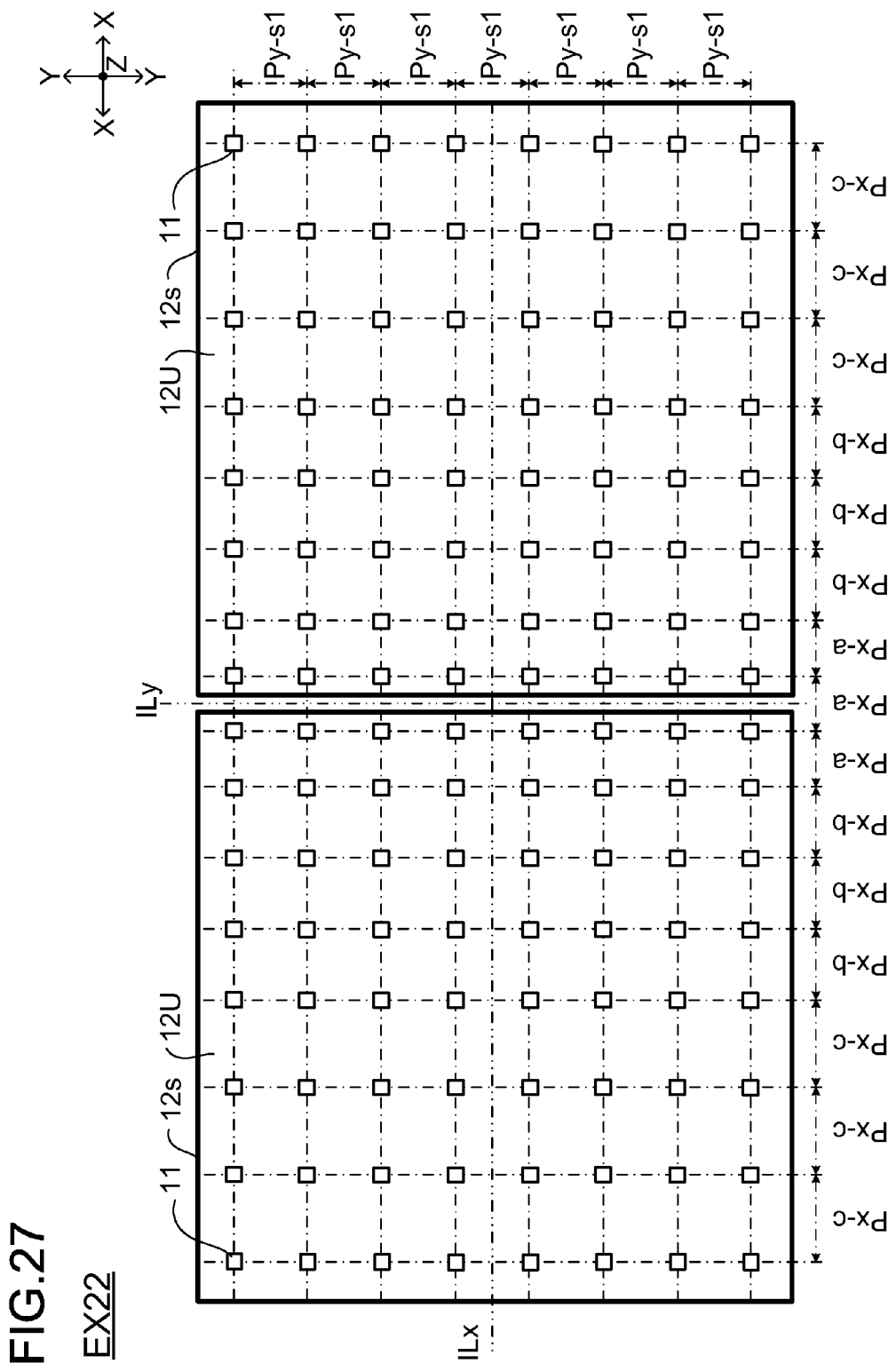
[FIG. 27] is a plan view showing an arrangement of LEDs in Example 22.

Although FIG. 27 shows smaller mounting boards 12s as if obtained by dividing the mounting board 12 in Example 2 into two parts, the number of mounting boards 12s is not limited to two. For example, four smaller mounting boards 12s as if obtained by dividing the mounting board 12 in Example 2 into four parts may be incorporated in the backlight unit 49.

That is, in a backlight unit 49 in which a plurality of mounting boards 12 having LEDs 11 mounted on them are arranged, a desired arrangement of LEDs 11 may be achieved by incorporating a plurality of mounting boards 12 having the same arrangement of LEDs 11.

Figure 28:
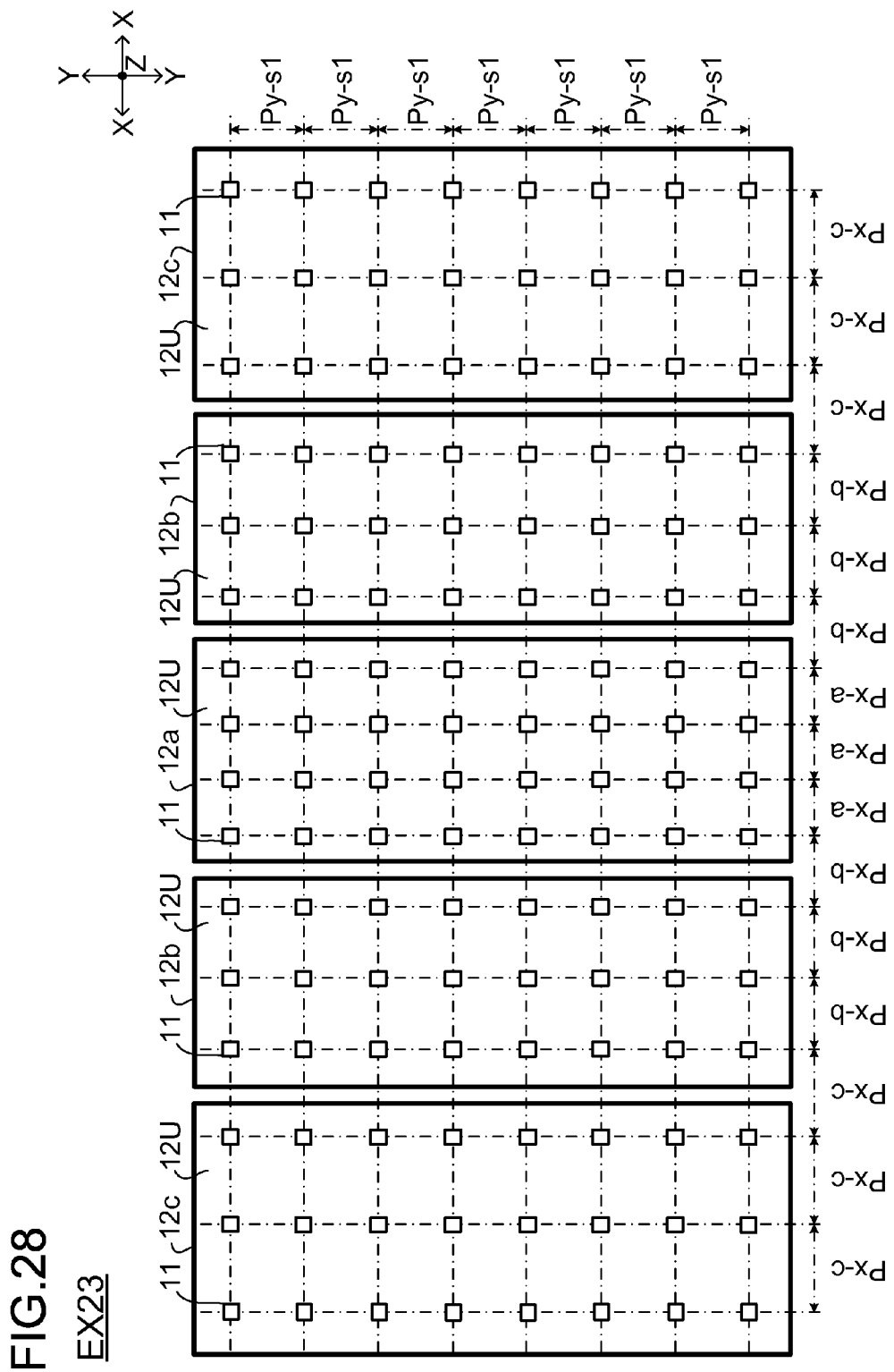
[FIG. 28] is a plan view showing an arrangement of LEDs in Example 23.

The mounting boards 12 may be designed as shown in FIG. 28 (Example 23). Specifically, in Example 2 (see FIG. 2), the backlight unit 49 may incorporate five mounting boards 12 on each of which the interval between the Y-direction rows, which each have LEDs 11 arranged in a row, is equal.

More specifically, this backlight unit 49 incorporates one mounting board 12a on which the interval between four Y-direction rows is equal, namely Px-a. On both sides of this mounting board 12a in the X direction, two mounting boards 12b are arranged on which the interval between three Y-direction rows is equal, namely Px-b. Further on the outer sides of these mounting boards 12b in the X direction, mounting boards 12*c* are arranged on which the interval between three Y-direction rows is equal, namely Px-c (with the intervals between the individual mounting boards 12*a* to 12*c* set appropriately).

That is, in a backlight unit 49 in which a plurality of mounting boards 12 (12*a*, 12*b*, 12*b*, 12*c*, and 12*c*) having LEDs 11 mounted on them are arranged, while the intervals between LEDs 11 are equal on each mounting board (for example, interval Px-a on the mounting board 12*a*), the intervals between LEDs 11 differ among the mounting boards (12*a*, 12*b*, 12*b*, 12*c*, and 12*c*). Even though a plurality of mounting boards 12 (12*a*, 12*b*, 12*b*, 12*c*, and 12*c*) with LEDs 11 arranged at different intervals are incorporated, the LEDs 11 are in a desired arrangement.

In this backlight unit 49, on each single mounting board 12, the LEDs 11 are arranged at equal intervals. This makes the mounting boards 12 extremely easy to mass-produce, and thus helps reduce the cost of the mounting boards 12. Moreover, the mounting boards 12 (12*a*, 12*b*, 12*b*, 12*c*, and 12*c*) have comparatively small sizes, and this facilitates the handling of the mounting boards 12 in the manufacturing process of the backlight unit 49. Thus, a backlight unit 49 incorporating such mounting boards 12 can be manufactured easily and at reduced cost. Moreover, the size of the backlight unit 49 does not limit the application of the mounting boards 12.

Although the description given above with reference to FIG. 27 (Example 22) and FIG. 28 (Example 23) deals with examples in which the LED modules MJ in Example 2 are used, similar designs are possible by use of any other LED modules MJ described in connection with Embodiments 1 to 4.

[Other Embodiments]

The present invention may be carried out in any manners other than specifically described by way of embodiments above, and allows many modifications and variations.

For example, in a case where LEDs 11 are arranged as shown in FIG. 27, an imaginary line ILy may be set. The imaginary line ILy lies on the planar center of the planar light, and can divide the plane of the planar light into a plurality of areas. The arrangement of a plurality of LEDs 11 that produce the light in one of the so divided areas and the arrangement of a plurality of LEDs 11 that produce the light in the other of the so divided areas are line-symmetric about the imaginary line ILy.

As shown in FIG. 27, apart from the imaginary line ILy along the Y direction, an imaginary line ILx along the X direction my be set (this imaginary line ILx also lies on the planar center of the planar light). The arrangement of a plurality of LEDs 11 that produce the planar light in one of the areas so divided by the imaginary line ILx and the arrangement of a plurality of LEDs 11 that produce the planar light in the other of the areas so divided by the imaginary line ILx are line-symmetric about the imaginary line ILx (that is, about the imaginary line ILy, the LEDs 11 are arranged symmetrically between left and right and, about the imaginary line ILx, the LEDs 11 are arranged symmetrically between top and bottom).

Also in many arrangements of LEDs 11 other than that shown in FIG. 27 (for example, those shown in FIGS. 1 to 6, 8 to 13, 15, 16, 22 to 25, and 28), at least one imaginary line IL that lies on the planar center of the planar light and that can divide the planar light into a plurality of parts can be set. Then, the arrangement of a plurality of LEDs 11 that produce one of the so divided parts of the planar light and the arrangement of a plurality of LEDs 11 that produce the other of the so divided parts of the planar light are line-symmetric about the imaginary line IL.

With these designs, when the control unit 21 shown in FIG. 19 controls the LEDs 11 in various ways according to a given algorism, the same sequence of control is repeated, and this alleviates the burden of control. It is also easy to produce the program for the control of the light emission of the LEDs 11, which affects the luminance distribution of the planar light.

The control unit 21, more specifically the pulse width modulator 26, may have the function of varying the current value (value of electric current) supplied to the LEDs 11 on an LED 11 by LED 11 basis. That is, the control unit 21 then controls the light emission luminance of the LEDs 11 by increasing and decreasing the current value supplied to the LEDs 11 (i.e., the control unit 21 varies the light emission luminance specific to the LEDs 11 on an LED 11 by LED 11 basis).

Figure 29:
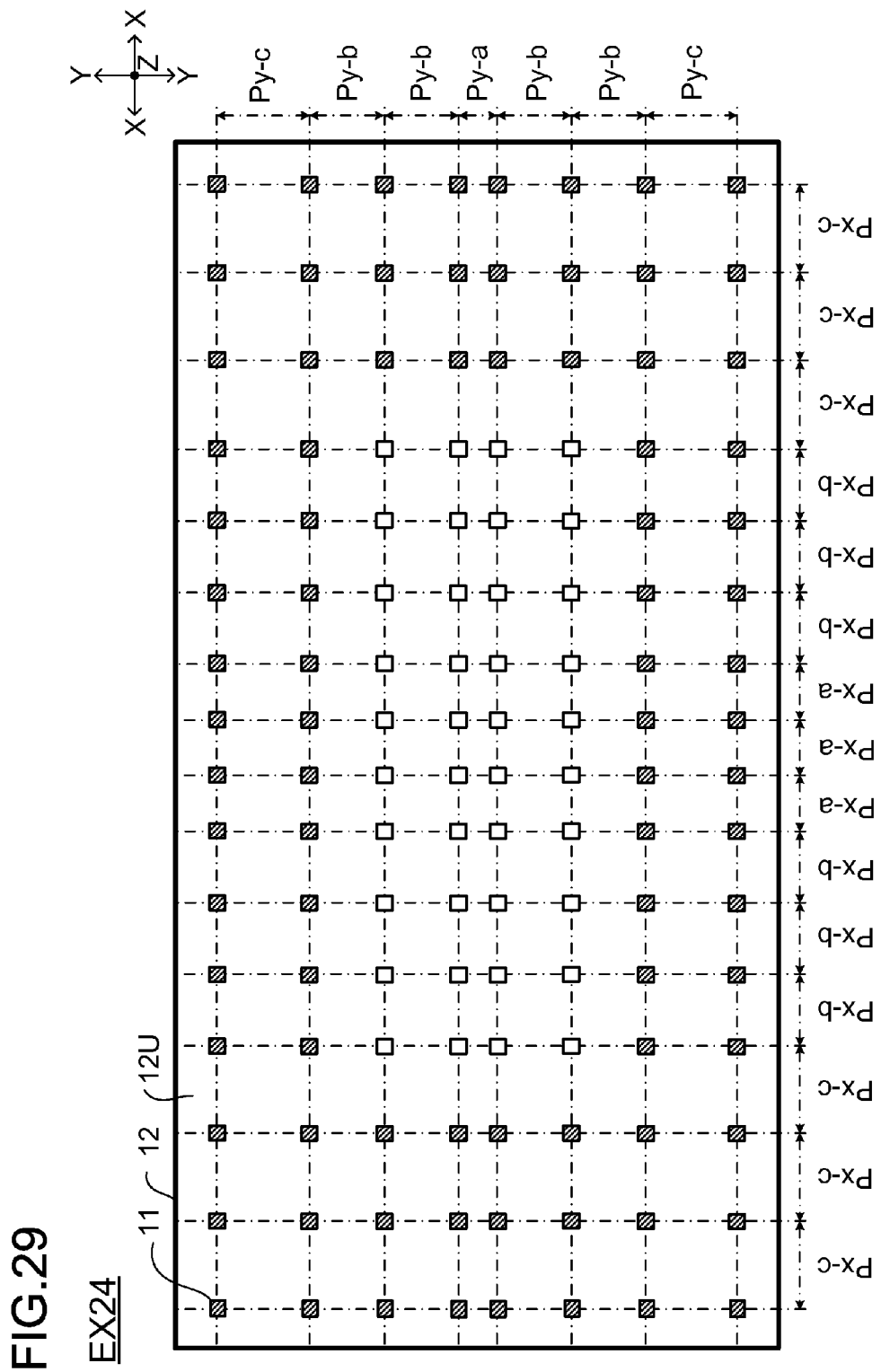
[FIG. 29] is a plan view showing an arrangement of LEDs in Example 24.

With a control unit 21 having that function, for example, as shown in FIG. 29 (Example 24), which shows an arrangement of LEDs 11 similar to that in Example 3, the current value supplied to the LEDs 11 indicated by diagonal-line hatching may be made different from the current value supplied to the other LEDs 11.

In a case where, as described above, the control unit (current controller) 21 varies the current value supplied to the LEDs 11 between LEDs 11 arranged at longer intervals and LEDs 11 arranged at shorter intervals, more specifically, in a case where the current value supplied to LEDs 11 arranged at longer intervals is higher than the current value supplied to LEDs 11 arranged at shorter intervals, the following applies.

In the backlight unit 49 of Example 3 in Embodiment 1, with a view to suppressing the number of LEDs 11 but nevertheless permitting humans to perceive the planar light to have uniform luminance, the arrangement of the LEDs 11 is so devised that the luminance near the center of the planar light is higher than the luminance in the region elsewhere than near the center.

However, as shown in FIG. 29, which shows Example 24, even in an arrangement of LEDs 11 similar to that in FIG. 3 (Example 3), the control unit 21 controls the current value such that the current value supplied to LEDs 11 arranged at longer intervals (the LEDs 11 hatched with slant lines) is higher than the current value supplied to LEDs 11 arranged at shorter intervals (the LEDs 11 without hatching). This makes the luminance in the region elsewhere than near the planar center close to the luminance near the center of the planar light.

Thus, compared with the backlight unit 49 of Example 3, the backlight unit 49 incorporating the LEDs 11 of Example 24, despite a comparatively small number of LEDs 11, reliably enhances the uniformity of the planar light.

Figure 30:
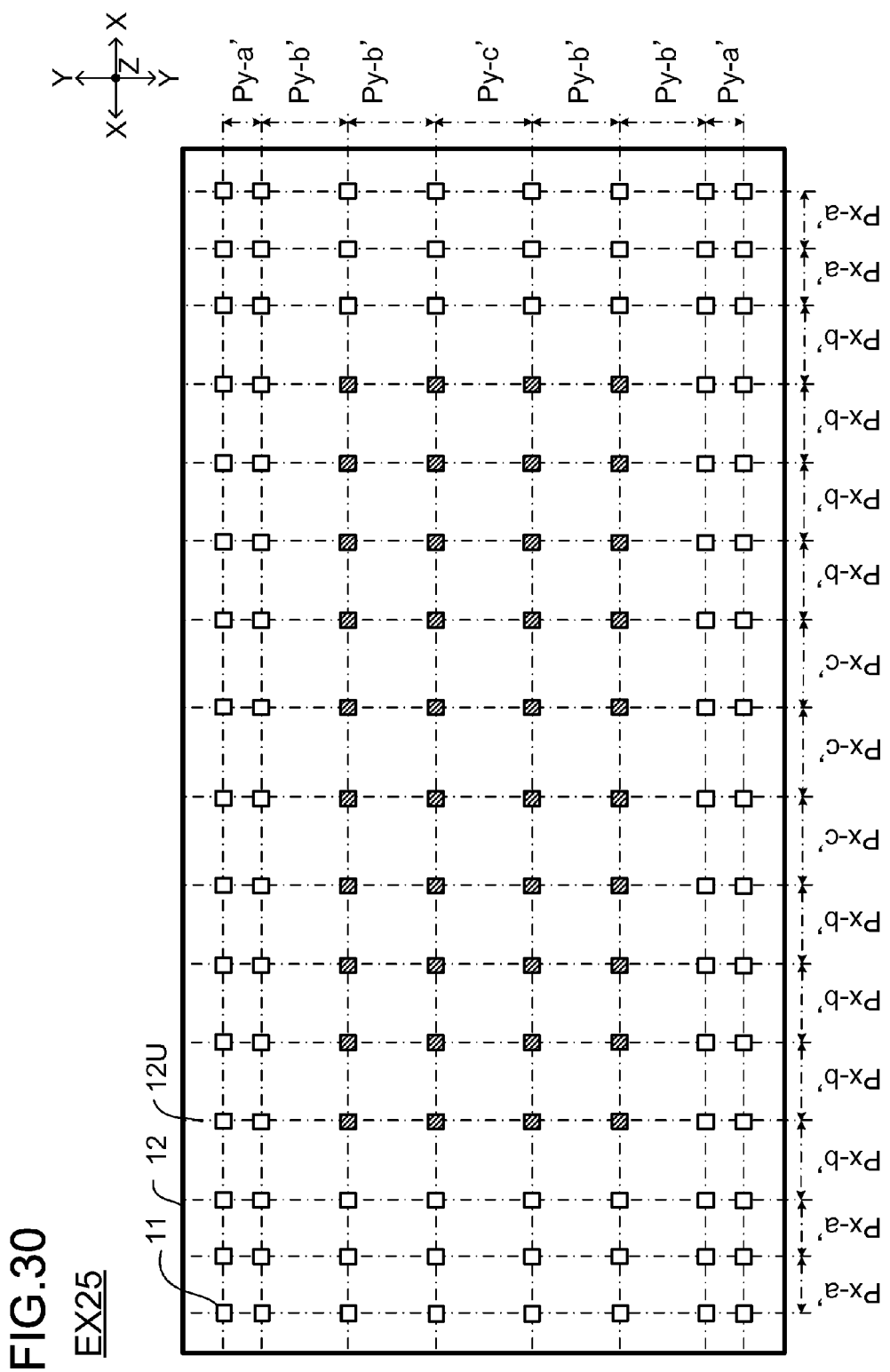
[FIG. 30] is a plan view showing an arrangement of LEDs in Example 25.
Figure 31:
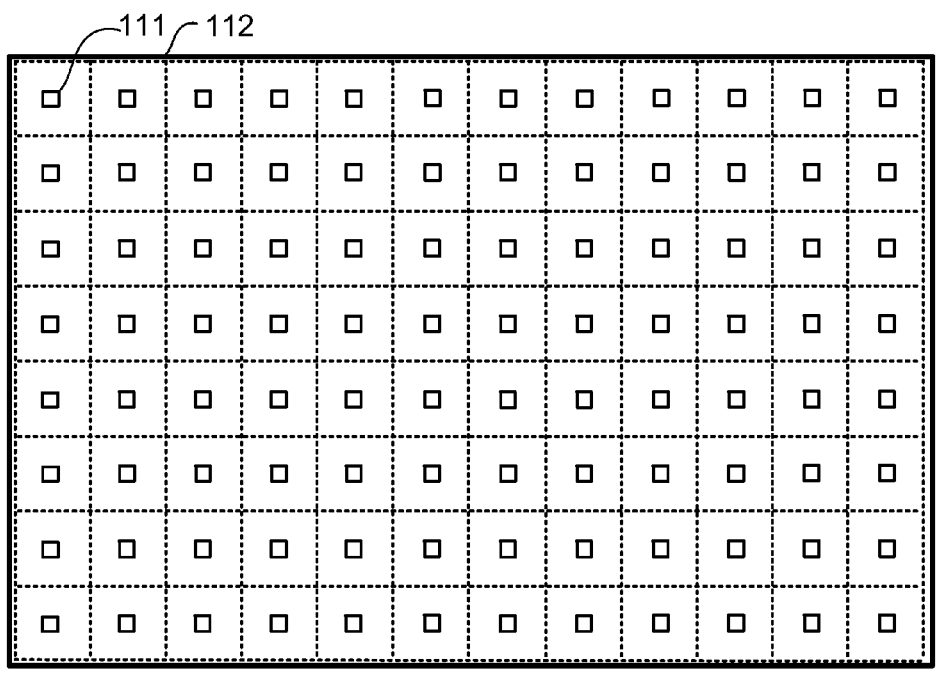
[FIG. 31] is a plan view showing an arrangement of LEDs incorporated in a conventional backlight unit.
Figure 32:
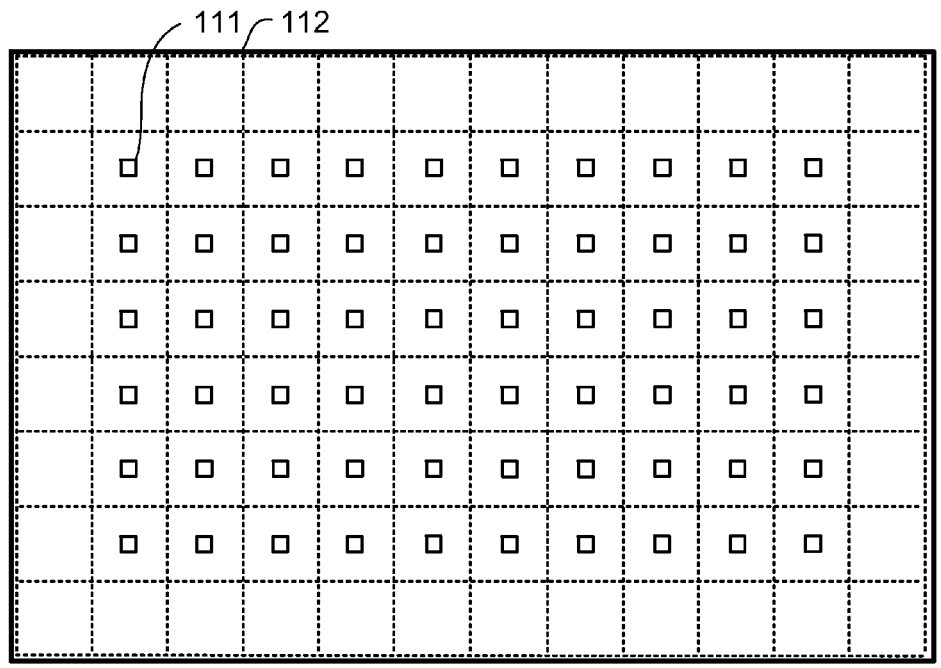
[FIG. 32] is a plan view showing an arrangement of LEDs incorporated in a conventional backlight unit.

For example as shown in FIG. 30 (Example 25), which shows an arrangement of LEDs 11 similar to that in Example 10, the control unit 21 may vary the current value supplied to the LEDs 11 indicated by diagonal-line hatching from the current value supplied to the other LEDs 11.

Specifically, in the backlight unit 49 of Example 10 in Embodiment 2, with a view to suppressing the number of LEDs 11 but nevertheless preventing insufficient luminance in a peripheral region of the planar light while retaining the uniformity of the planar light, the arrangement of the LEDs 11 (see FIG. 10) is so devised that the luminance in a region elsewhere than near the center of the planar light is higher than the luminance near the center of the planar light.

However, as shown in FIG. 30, which shows Example 25, even in an arrangement of LEDs 11 similar to that in FIG. 10 (Example 10), the control unit 21 controls the current value such that the current value supplied to LEDs 11 arranged at longer intervals (the LEDs 11 hatched with slant lines) is higher than the current value supplied to LEDs 11 arranged at shorter intervals (the LEDs 11 without hatching). This makes the luminance near the center of the planar light close to the luminance in the region elsewhere than near the planar center.

Thus, compared with the backlight unit 49 of Example 10, the backlight unit 49 incorporating the LEDs 11 of Example 25, despite a comparatively small number of LEDs 11, reliably enhances the uniformity of the planar light.

In Examples 24 and 25, through the control by the control unit 21 of the current supplied to the LEDs 11, the light emission luminance specific to the LEDs 11 is varied on an LED 11 by LED 11 basis to enhance the uniformity of the planar light. This, however, is not meant as any limitation; the uniformity of the planar light can be enhanced by relying on a difference in light emission efficiency among LEDs 11 (i.e., by use of LEDs 11 that emit light at different luminance when supplied with a given current). That is, the light emission efficiency of LEDs 11 arranged at longer intervals may be higher than the light emission efficiency of LEDs 11 arranged at shorter intervals.

For example, in FIGS. 29 and 30, the light emission efficiency of LEDs 11 arranged at longer intervals (the LEDs 11 hatched by slant lines) may be higher than the light emission efficiency of LEDs 11 arranged at shorter intervals (the LEDs 11 without hatching). This design permits the use of comparatively inexpensive LEDs 11 with low light emission luminance, and thus helps reduce the cost of the backlight unit 49.

A control unit 21 that varies the luminance distribution of planar light by varying the current value supplied to LEDs 11 as described above can be called a luminance-varying system. Using LEDs 11 with different light emission efficiency as the plurality of LEDs 11 that produce planar light can also be called a luminance-varying system (varying the luminance distribution of planar light encompasses, for example, varying planar light with a non-uniform luminance distribution in such a way as to make it uniform, and varying planar light with a uniform luminance distribution in such a way as to give it a non-uniform luminance distribution to a degree negligible in terms of the characteristics of the human visual sense).

Although the above description deals with cases where the control unit 21 supplies electric current to LEDs 11 in an unequal arrangement, this is not meant as any limitation. Even in a backlight unit 49 in which all LEDs 11 are in a lattice arrangement at equal pitches, the control unit 21 can vary the luminance distribution of planar light.

For example, in a case where LEDs 11 in an equal arrangement is in a lattice arrangement, within the group of those LED 11 in a lattice arrangement, the current value supplied to LEDs 11 near the center may differ from the current value supplied to LEDs 11 near the periphery. With a backlight unit 49 like this, it is possible both to permit humans to perceive the entire planar light to have uniform luminance and to prevent insufficient luminance in a peripheral region of the planar light while retaining the uniformity of the planar light.

Likewise, although the above description deals with examples where LEDs 11 with varying light emission efficiency are in an unequal arrangement, this is not meant as any limitation. Specifically, even in a backlight unit 49 in which LEDs with varying light emission efficiency are in an equal arrangement like a lattice, the luminance distribution of the planar light can be varied.

For example, in a case where LEDs 11 in an equal arrangement is in a lattice arrangement, within the group of the LEDs 11 in a lattice arrangement, the light emission efficiency of LEDs 11 near the center may differ from the light emission efficiency of LEDs 11 near the periphery. With a backlight unit 49 like this, it is possible both to permit humans to perceive the entire planar light to have uniform luminance and to prevent insufficient luminance in a peripheral region of the planar light while retaining the uniformity of the planar light.

The LEDs 11 in a lattice arrangement do not all have to emit light of the same color (for example, white) (that is, the LEDs 11 do not all need to be white-light-emitting LEDs 11W). For example, while the light near the periphery of the planar light is produced by white-light-emitting LEDs 11W, the light near the center of the planar light may be produced by mixing light from red-light-emitting LEDs 11R, green-light-emitting LEDs 11G, and blue-light-emitting LEDs 11B.

In one specific example, for example, of the LEDs 11 in Example 15 shown in FIG. 15, the four LEDs 11 located within the central divided regions 13C may be an LED 11R, LED 11G, LED 11G, and LED 11B, and the one LED 11 located within the peripheral divided regions 13T may be an LED 11W.

With this design, near the center of the planar light, white light is produced by mixing together light of different colors unlike that near the periphery, and thus is more vividly white than white light emitted singly. This affords vividness in the principal part (near the center of the liquid crystal display panel 59) of the image displayed on the liquid crystal display panel 59 which receives such planar light.

Although the above description deals with examples where LEDs 11 as light-emitting devices are used as point light sources, this is not meant as any limitation. Instead, for example, light-emitting devices such as laser devices, or light-emitting devices formed of a self-luminous substance, such as organic or inorganic EL (electroluminescence) light-emitting devices, may be used. Instead of light-emitting devices, point light sources such as lamps may be used.

The control unit 21 shown in FIG. 19 may be incorporated in the liquid crystal display panel 59 or in the backlight unit 49. That is, such members need to be incorporated in the liquid crystal display apparatus 69.

Backlight units 49 as described above are particularly useful in attempting to enhance the quality of the image displayed on the liquid crystal display panel 59 by use of planar light (that is, backlight BL).

LIST OF REFERENCE SIGNS

11 LED (light-emitting device)
12 mounting board
12U mounting surface
MJ LED module (light-emitting module)
13 divided region
13C central divided region
13T peripheral divided region
21 control unit
22 video signal processor
23 liquid crystal display panel controller
24 LED controller
25 LED driver controller
26 pulse width modulator
31 gate driver
32 source driver
33 LED driver
41 backlight chassis
42 light guide plate
43 reflective sheet
44 diffusive sheet
45 prism sheet
46 prism sheet
49 backlight unit (illuminating apparatus)

59 liquid crystal display panel (display panel)
69 liquid crystal display apparatus (display apparatus)
X direction in which LEDs are arranged side by side
Y direction in which LEDs are arranged side by side

The invention claimed is:

1. An illuminating apparatus including a plurality of point light sources, wherein
the plurality of point light sources are arranged two-dimensionally so that light therefrom gathers to form planar light,
the planar light is divided into a plurality of sections, and the illuminating apparatus includes a luminance-varying system that can vary luminance section by section,
the luminance-varying system is an arrangement involving a difference in density of the point light sources,
the illuminating apparatus includes a current controller that controls current values supplied to the point light sources, and
in a case where the point light sources are arranged some at a longer interval and other at a shorter interval,
the current controller makes different a current value supplied to the point light sources arranged at a longer interval and a current value supplied to the point light sources arranged at a shorter interval.

2. The illuminating apparatus according to claim 1, wherein
when, of two intersecting directions, one is referred to as an X direction and another is referred to as a Y direction,
the illuminating apparatus includes point light sources arranged side by side along the X and Y directions, and
there are a plurality of kinds of intervals among intervals between the point light sources arranged side by side along at least one of the X and Y directions.

3. The illuminating apparatus according to claim 2, wherein
X-direction rows in which the point light sources are arranged at same positions with respect to the Y direction and side by side along the X direction are arranged side by side in the Y direction so that the plurality of point light sources are in a lattice-like planar arrangement.

4. The illuminating apparatus according to claim 3, wherein positions of the point light sources with respect to the X direction between adjacent X-direction rows are same from one X-direction row to the next.

5. The illuminating apparatus according to claim 3, wherein positions of the point light sources with respect to the X direction between adjacent X-direction rows differ from one X-direction row to the next.

6. The illuminating apparatus according to claim 4, wherein
when rows which are formed as a result of the X-direction rows being arranged side by side in the Y direction and in which the point light sources are arranged at same positions with respect to the X direction and side by side along the Y direction are referred to as Y-direction rows,
the illuminating apparatus further includes a point light source that is not along either the X-direction rows or the Y-direction rows.

7. The illuminating apparatus according to claim 2, wherein
one row of the point light sources arranged side by side along the X direction and one row of the point light sources arranged side by side along the Y direction emit light in different directions, and the light overlaps to form the planar light.

8. The illuminating apparatus according to claim 1, wherein
an interval at which a plurality of the point light sources that produce light near a planar center of the planar light are arranged is shorter than an interval at which a plurality of the point light sources that produce light at periphery elsewhere than near the planar center of the planar light are arranged.

9. The illuminating apparatus according to claim 1, wherein
an interval at which a plurality of the point light sources that produce light near a planar center of the planar light are arranged is longer than an interval at which a plurality of the point light sources that produce light at periphery elsewhere than near the planar center of the planar light are arranged.

10. The illuminating apparatus according to claim 1, wherein
the plurality of point light sources are in a planar arrangement, an arrangement surface of the planar arrangement includes a plurality of divided regions divided like a lattice, and
there are a plurality of kinds of numbers among numbers of point light sources located within the divided regions respectively.

11. The illuminating apparatus according to claim 10, wherein
when divided regions in which the point light sources that produce light near the planar center of the planar light are located are referred to as central divided regions, and
divided regions in which the point light sources that produce light at periphery elsewhere than near the planar center of the planar light are located are referred to as peripheral divided regions, then
a number of point light sources included in the central divided regions is greater than a number of point light sources included in the peripheral divided regions.

12. The illuminating apparatus according to claim 10, wherein
when divided regions in which the point light sources that produce light near the planar center of the planar light are located are referred to as central divided regions, and
divided regions in which the point light sources that produce light at periphery elsewhere than near the planar center of the planar light are located are referred to as peripheral divided regions, then
a number of point light sources included in the peripheral divided regions is greater than a number of point light sources included in the central divided regions.

13. The illuminating apparatus according to claim 1, wherein
a plurality of mounting boards on which the point light sources are mounted are arranged, and
whereas intervals at which the point light sources are arranged within each of the mounting boards are equal, the intervals at which the point light sources are arranged differ among the mounting boards.

14. The illuminating apparatus according to claim 1, wherein
a plane of the planar light is divided into a plurality of areas by an imaginary line lying on a planar center of the planar light, and an arrangement of a plurality of the point light sources that produce light of the planar light in one of the divided areas and an arrangement of a plurality of the point light sources that produce light of the planar light in another of the divided areas are line-symmetric about the imaginary line.

15. The illuminating apparatus according to claim 1, wherein
current supplied to the point light sources arranged at a longer interval is higher than current supplied to the point light sources arranged at a shorter interval.

16. A display apparatus comprising:
an illuminating apparatus according to claim 1; and
a display panel that receives light emanating from the illuminating apparatus.

17. An illuminating apparatus including a plurality of point light sources, wherein
the plurality of point light sources are arranged two-dimensionally so that light therefrom gathers to form planar light,
the planar light is divided into a plurality of sections, and the illuminating apparatus includes a luminance-varying system that can vary luminance section by section,
the luminance-varying system is an arrangement involving a difference in density of the point light sources,
the point light sources are arranged some at a longer interval and other at a shorter interval, and
light emission efficiency of the point light sources differs between the point light sources arranged at a longer interval and the point light sources arranged at a shorter interval.

18. The illuminating apparatus according to claim 17, wherein
light emission efficiency of the point light sources arranged at a longer interval is higher than light emission efficiency of the point light sources arranged at a shorter interval.

* * * * *